(12) United States Patent
Meyers-Normand et al.

(10) Patent No.: US 12,525,335 B2
(45) Date of Patent: Jan. 13, 2026

(54) COMPUTERIZED SYSTEMS FOR PREDICTION OF GEOGRAPHIC ATROPHY PROGRESSION USING DEEP LEARNING APPLIED TO CLINICAL IMAGING

(71) Applicant: Novartis AG, Basel (CH)

(72) Inventors: Guillaume Meyers-Normand, Basel (CH); Ronan Danno, Saint Contest (FR); Bruno Lay, Saint Contest (FR); Gwenolé Quellec, Brest (FR); Georges Weissgerber, Basel (CH)

(73) Assignee: Novartis AG, Basel (CH)

( * ) Notice: Subject to any disclaimer, the term of this patent is extended or adjusted under 35 U.S.C. 154(b) by 657 days.

(21) Appl. No.: 17/436,528

(22) PCT Filed: Mar. 5, 2020

(86) PCT No.: PCT/IB2020/051896
§ 371 (c)(1),
(2) Date: Sep. 3, 2021

(87) PCT Pub. No.: WO2020/178773
PCT Pub. Date: Sep. 10, 2020

(65) Prior Publication Data
US 2022/0181007 A1    Jun. 9, 2022

(30) Foreign Application Priority Data

Mar. 5, 2019 (EP) .................................. 19305253

(51) Int. Cl.
*G16H 30/40* (2018.01)
*G16H 50/50* (2018.01)

(52) U.S. Cl.
CPC ............. *G16H 30/40* (2018.01); *G16H 50/50* (2018.01)

(58) Field of Classification Search
CPC ......... G16H 30/40; G16H 50/50; G16H 30/00
See application file for complete search history.

(56) References Cited

U.S. PATENT DOCUMENTS

| 10,610,098 B1* | 4/2020 | Soliz ................... G06V 40/197 |
| 2016/0284103 A1* | 9/2016 | Huang ............... G01B 9/02091 |

(Continued)

FOREIGN PATENT DOCUMENTS

| WO | WO-2018069768 A2 * | 4/2018 | ............. A61B 3/024 |

OTHER PUBLICATIONS

Jdhao, "How to Resize, Pad Image to Square Shape and Keep Its Aspect Ratio with Python-jdhao's blog", Nov. 6, 2017, 3 pages.

(Continued)

*Primary Examiner* — Eliza A Lam
(74) *Attorney, Agent, or Firm* — DLA Piper LLP (US)

(57) ABSTRACT

An electronic device is disclosed. The device receives retinal images and patient data corresponding to the retinal images. The device can train a first machine learning model ("model") based on a first group of the retinal images and patient data corresponding to the first group and a second model based on a second group of the retinal images and patient data corresponding to the second group. The electronic device can generate a first prediction based on the first subset of a third group of the retinal images and a second prediction based on the second subset of the third group. After training the first model and the second model, the device can train a third model to predict a geographic atrophy progression in an eye of a patient based on the first and second predictions, the first and second subsets, and patient data corresponding to the first and second subset.

15 Claims, 17 Drawing Sheets

(56) References Cited

U.S. PATENT DOCUMENTS

2017/0079955 A1* 3/2017 Boyd ............. C12Y 304/21046
2018/0084988 A1* 3/2018 Chakravorty ........ A61B 5/7275
2018/0315188 A1* 11/2018 Tegzes ...................... G06T 7/11
2019/0043193 A1* 2/2019 Odaibo ................. G06F 18/285

OTHER PUBLICATIONS

Normand et al., "Prediction of Geographic Atrophy progression by Deep Learning Applied to Retinal Imaging", Publications of the Annual Convention of the Association for Research in Vision and Ophthalmology (ARVO), May 2, 2019, 1 page.

* cited by examiner

600

| Patient ID | Age | Eye Position | Actual Lesion Size - 6 months (mm$^2$) | Actual Lesion Size - 12 months (mm$^2$) | Actual Lesion Size 18 months (mm$^2$) | Actual Lesion Size 24 months (mm$^2$) |
|---|---|---|---|---|---|---|
| 614 | 56 | L | 0.1 | 0.3 | - | 0.9 |
| 616 | 27 | R | - | 0.19 | 0.20 | 0.21 |
| 618 | - | R | 2.35 | 3.4 | 3.545 | 5.78 |
| 620 | 67 | R | 5.9 | 5.9 | 6.1 | 7.7 |
| 622 | 84 | L | 0.07 | 1.2 | - | 1.3 |
| 624 | 33 | R | - | 0.35 | 0.42 | 1 |
| 626 | 29 | L | 0.063 | - | 0.065 | 0.67 |
| 628 | 67 | L | 2.5 | 2.75 | 5.4 | 5.8 |
| n | ... | ... | ... | ... | ... | ... |

Receive retinal image and patient data
1002

Receive prediction of geographic atrophy progression
in at least one eye of the patient
1004

Output notification based on the prediction
1006

Output heatmap based on the prediction
1008

FIG. 10

COMPUTERIZED SYSTEMS FOR PREDICTION OF GEOGRAPHIC ATROPHY PROGRESSION USING DEEP LEARNING APPLIED TO CLINICAL IMAGING

CROSS-REFERENCE TO RELATED APPLICATIONS

This application is a U.S. National Stage patent application of PCT/IB2020/051896, titled "COMPUTERIZED SYSTEMS FOR PREDICTION OF GEOGRAPHIC ATROPHY PROGRESSION USING DEEP LEARNING APPLIED TO CLINICAL IMAGING," filed on Mar. 5, 2020, which claims priority to European Application No. 19305253.7, titled "COMPUTERIZED SYSTEMS FOR PREDICTION OF GEOGRAPHIC ATROPHY PROGRESSION USING DEEP LEARNING APPLIED TO CLINICAL IMAGING," filed Mar. 5, 2019, the contents of each of which are hereby incorporated by reference in their entirety for all purposes.

FIELD

The present disclosure generally relates to deep learning, and more specifically, to computing systems and processes for utilizing and training a computing system to predict geographic atrophy progression based on retinal images.

BACKGROUND

Geographic atrophy, also known as atrophic age-related macular degeneration (AMD) or advanced dry AMD, is an advanced form of age-related macular degeneration that affects approximately five million people worldwide. Currently, there is no cure. A person with geographic atrophy generally experiences progressive and irreversible loss of the retina. The loss of the retina presents itself in the form of a lesion representing retinal pigment epithelial atrophy, using fundus autofluorescence imaging, that increasingly grows in size.

Clinicians and scientists often track the lesion growth rate (i.e., geographic atrophy progression) to identify and provide treatments to minimize the effects of geographic atrophy in patients. In some cases, clinicians and scientists find it useful to make predictions concerning the rate of geographic atrophy in order to study patients and determine effective treatments for the condition.

However, accurately tracking geographic atrophy progression is difficult. Currently, to track geographic atrophy progression, clinicians and scientists manually measure the lesion growth over a period of time (e.g., six to eighteen months) using retinal images. These manual measurements often lead to inaccurate tracking of geographic progression for many reasons, such as variability between measures and small changes in lesion size. Moreover, there is a wide range of lesion growth rate between patients. Ultimately, it follows that the inaccurate tracking of geographic progression leads to challenges in identification of treatments of geographic atrophy in patients. In addition, predictions of geographic atrophy progression in patients remain unfeasible, thus, inhibiting clinicians and scientist from effectively studying patients and finding better ways to treat the condition.

Accordingly, there is a need for a more reliable, accurate, and reproducible system and process for measuring and predicting geographic atrophy progression in patients that do not merely rely on the manual measurements gathered by clinicians and scientist in the field.

SUMMARY

The following systems and processes, described herein, for utilizing and training a computing system to predict geographic atrophy progression based on retinal images provides improvements over existing techniques in the field. In addition, the following systems and processes depart from the existing techniques in novel ways, providing an accurate measure and prediction geographic atrophy progression to assist clinicians and scientist in the field.

In some embodiments, a computer-implemented method for training a predictive model for geographic atrophy progression in at least one eye of a patient is disclosed. The method can comprise, at a computing system including at least a first device that includes at least one processor and memory, receiving retinal images and patient data corresponding to the retinal images. The method can also comprise training a first machine learning model based on a first group of the retinal images and patient data corresponding to the first group, wherein the first group includes a first type of retinal image. The method can further comprise training a second machine learning model based on a second group of the retinal images and patient data corresponding to the second group, wherein the second group includes a second type of retinal image that is different from the first type of retinal image. The method can also comprise generating, using the trained first machine learning model, a first prediction of geographic atrophy progression based on a first subset of a third group of the retinal images and patient data corresponding to the first subset. The method can comprise generating, using the trained second machine learning model, a second prediction of geographic atrophy progression based on a second subset of the third group of the retinal images and patient data corresponding to the second subset. After training the first machine learning model and the second machine learning model, training a third machine learning model to predict a geographic atrophy progression in at least one eye of a patient based on the first prediction, the method can comprise training a third machine learning model to predict a geographic atrophy progression in at least one eye of a patient based on the first prediction, the second prediction, the first subset, the second subset and patient data corresponding to the first subset and the second subset.

In some embodiments, an electronic device for training a predictive model for geographic atrophy progression in at least one eye of a patient is disclosed. The electronic device can include at least one processor and memory storing one or more programs configured to be executed by the at least one processor, the one or more programs including instructions for receiving retinal images and patient data corresponding to the retinal images. The one or more programs can also include instructions for training a first machine learning model based on a first group of the retinal images and patient data corresponding to the first group, wherein the first group includes a first type of retinal image. The one or more programs can further include instructions for training a second machine learning model based on a second group of the retinal images and patient data corresponding to the second group, wherein the second group includes a second type of retinal image that is different from the first type of retinal image. The one or more programs can include instructions for generating, using the trained first machine learning model, a first prediction of geographic atrophy progression based on a first subset of a third group of the retinal images and patient data corresponding to the first subset. The one or more programs can also include instructions for generating, using the trained second machine learning model, a second prediction of geographic atrophy progression based on a second subset of the third group of the retinal images and patient data corresponding to the second subset. After training the first machine learning model and the second machine learning model, the one or more programs can also include instructions for training a third machine learning model to predict a geographic atrophy progression in at least one eye of the patient based on the first prediction, the second prediction, the first subset, the second subset and patient data corresponding to the first subset and the second subset.

In some embodiments, a computer-implemented method for controlling a user interface in accordance with a prediction of geographic atrophy progression in at least one eye of a patient is disclosed. The electronic device can include at least one processor and memory storing one or more programs configured to be executed by the at least one processor, the one or more programs including instructions for, receiving a retinal image and patient data. The one or more programs can include instructions for subsequent to receiving the retinal image and patient data, receiving a prediction of geographic atrophy progression in at least one eye of the patient, wherein the prediction is determined by an algorithm based on the retinal images and patient data. Subsequent to receiving the prediction of geographic atrophy progression in at least one eye of the patient, the one or more programs can also include instructions for outputting a notification based on the prediction of geographic atrophy progression in at least one eye of the patient.

In some embodiments, an electronic device for controlling a user interface in accordance with a prediction of geographic atrophy progression in at least one eye of a patient is disclosed. The method can comprise, at a computing system including at least a first device that includes at least one processor and memory, receiving a retinal image and patient data. The method can comprise subsequent to receiving the retinal image and patient data, receiving a prediction of geographic atrophy progression in at least one eye of the patient, wherein the prediction is determined by an algorithm based on the retinal images and patient data. Subsequent to receiving the prediction of geographic atrophy progression in at least one eye of the patient, the method can also comprise outputting a notification based on the prediction of geographic atrophy progression in at least one eye of the patient.

The executable instructions for performing the above functions are, optionally, included in a non-transitory computer-readable storage medium or other computer program product configured for execution by one or more processors.

BRIEF DESCRIPTION OF THE DRAWINGS

The accompanying drawings, which are incorporated in and constitute part of this specification, illustrate various embodiments and together with the description, serve to explain one or more aspects of the disclosed embodiments. In the drawings:

FIG. 6 illustrates exemplary patient data in accordance with some embodiments;

FIG. 10 illustrates an exemplary method for controlling a user interface in accordance with a prediction of geographic atrophy progression in at least one eye of a patient.

DETAILED DESCRIPTION

The following description sets forth exemplary systems, devices, methods, parameters, and the like. It should be recognized, however, that such description is not intended as a limitation on the scope of the present disclosure but is instead provided as a description of exemplary embodiments. For example, reference is made to the accompanying drawings in which it is shown, by way of illustration, specific example embodiments. It is to be understood that changes can be made to such example embodiments without departing from the scope of the present disclosure. Accordingly, the following detailed description does not limit the disclosed embodiments. Instead, the proper scope of the disclosed embodiments can be defined by the appended claims.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
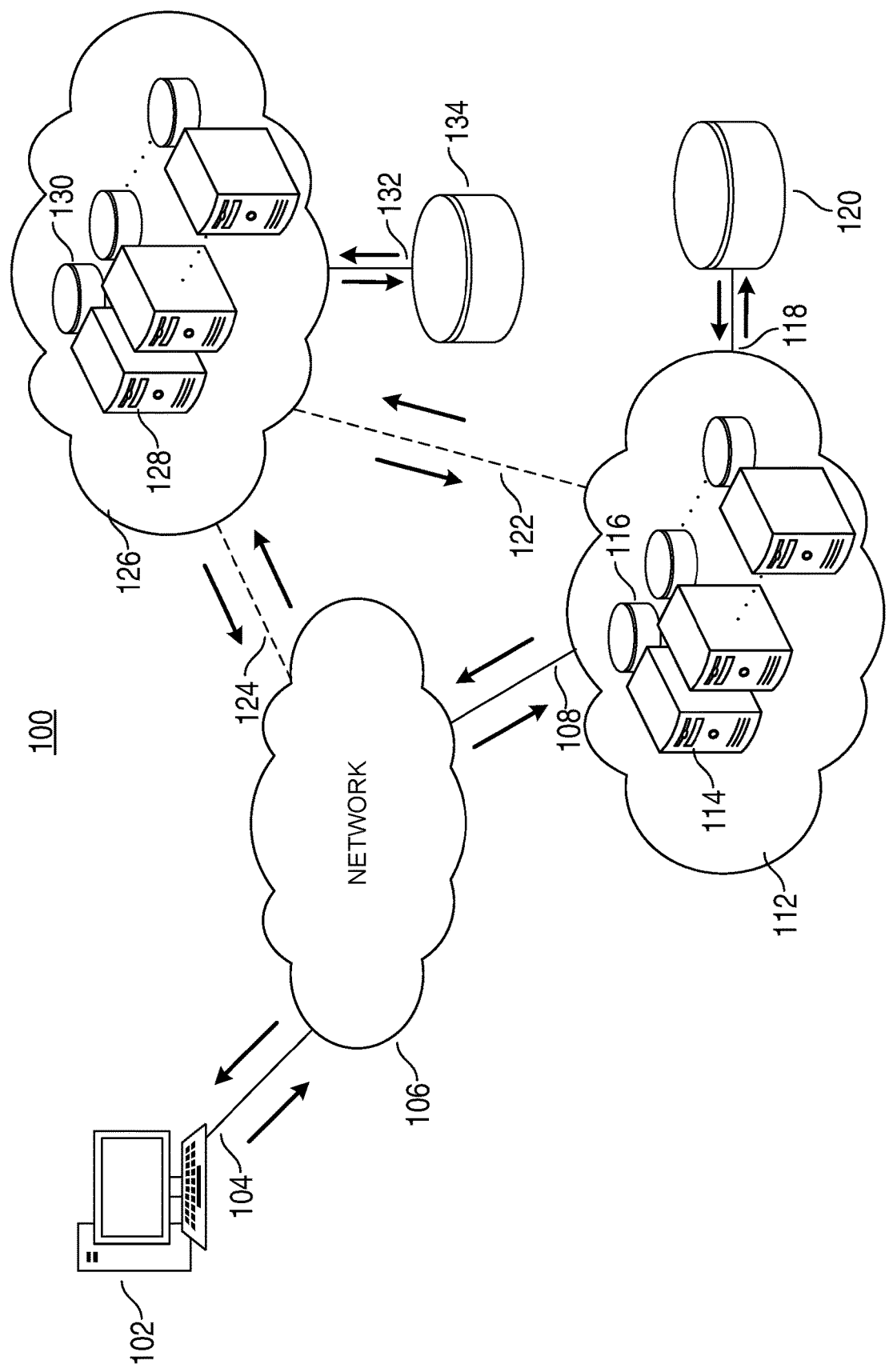
FIG. 1 illustrates an exemplary system of electronic devices in accordance with some embodiments.

Attention is now directed to embodiments of electronic devices and systems for performing the techniques described herein in accordance with some embodiments. FIG. 1 illustrates an exemplary system 100 of electronic devices (e.g., such as electronic device 300). System 100 includes a client system 102. In some embodiments, client system 102 includes one or more electronic devices (e.g., 300). For example, client system 102 can represent a health care provider's (HCP) computing system (e.g., one or more personal computers (e.g., desktop, laptop)) and can be used for the input and collection of patient data by a HCP, as well as for the output of patient data analysis (e.g., prognosis information). For further example, client system 102 can represent a patient's device (e.g., a home-use medical device; a personal electronic device such as a smartphone, tablet, desktop computer, or laptop computer) that is connected to one or more HCP electronic devices and/or to system 108, and that is used for the input and collection of patient data. In some embodiments, client system 102 includes one or more electronic devices (e.g., 300) networked together (e.g., via a local area network). In some embodiments, client system 112 includes a computer program or application (comprising instructions executable by one or more processors) for receiving patient data and/or communicating with one or more remote systems (e.g., 112, 126) for the processing of such patient data.

Client system 102 is connected to a network 106 via connection 104. Connection 104 can be used to transmit and/or receive data from one or more other electronic devices or systems (e.g., 112, 126). The network 106 can include any type of network that allows sending and receiving communication signals, such as a wireless telecommunication network, a cellular telephone network, a time division multiple access (TDMA) network, a code division multiple access (CDMA) network, Global System for Mobile communications (GSM), a third-generation (3G) network, fourth-generation (4G) network, a satellite communications network, and other communication networks. The network 106 can include one or more of a Wide Area Network (WAN) (e.g., the Internet), a Local Area Network (LAN), and a Personal Area Network (PAN). In some examples, the network 106 includes a combination of data networks, telecommunication networks, and a combination of data and telecommunication networks. The systems and resources 102, 112 and/or 126 communicate with each other by sending and receiving signals (wired or wireless) via the network 106. In some examples, the network 106 provides access to cloud computing resources (e.g., system 112), which can be elastic/on-demand computing and/or storage resources available over the network 106. The term 'cloud' services generally refers to a service performed not locally on a user's device, but rather delivered from one or more remote devices accessible via one or more networks.

Cloud computing system 112 is connected to network 106 via connection 108. Connection 108 can be used to transmit and/or receive data from one or more other electronic devices or systems and can be any suitable type of data connection (e.g., wired, wireless, or any combination of wired and wireless). In some embodiments, cloud computing system 112 is a distributed system (e.g., remote environment) having scalable/elastic computing resources. In some embodiments, computing resources include one or more computing resources 114 (e.g., data processing hardware). In some embodiments, such resources include one or more storage resources 116 (e.g., memory hardware). The cloud computing system 112 can perform processing (e.g., applying one or more machine learning models, applying one or more algorithms) of patient data (e.g., received from client system 102). In some embodiments, cloud computing system 112 hosts a service (e.g., computer program or application comprising instructions executable by one or more processors) for receiving and processing patient data (e.g., from one or more remote client systems, such as 102). In this way, cloud computing system 112 can provide patient data analysis services to a plurality of health care providers (e.g., via network 106). The service can provide a client system 102 with, or otherwise make available, a client application (e.g., a mobile application, a website application, or a downloadable program that includes a set of instructions) executable on client system 102. In some embodiments, a client system (e.g., 102) communicates with a server-side application (e.g., the service) on a cloud computing system (e.g., 112) using an application programming interface.

In some embodiments, cloud computing system 112 includes a database 120. In some embodiments, database 120 is external to (e.g., remote from) cloud computing system 112. In some embodiments, database 120 is used for storing one or more of patient data, algorithms, machine learning models, or any other information used by cloud computing system 112.

In some embodiments, system 100 includes cloud computing resource 126. In some embodiments, cloud computing resource 126 provides external data processing and/or data storage service to cloud computing system 112. For example, cloud computing resource 126 can perform resource-intensive processing tasks, such as machine learning model training, as directed by the cloud computing system 112. In some embodiments, cloud computing resource 126 is connected to network 106 via connection 124. Connection 124 can be used to transmit and/or receive data from one or more other electronic devices or systems and can be any suitable type of data connection (e.g., wired, wireless, or any combination of wired and wireless). For example, cloud computing system 112 and cloud computing resource 126 can communicate via network 106, and connections 108 and 124. In some embodiments, cloud computing resource 126 is connected to cloud computing system 112 via connection 122. Connection 122 can be used to transmit and/or receive data from one or more other electronic devices or systems and can be any suitable type of data connection (e.g., wired, wireless, or any combination of wired and wireless). For example, cloud computing system 112 and cloud computing resource 126 can communicate via connection 122, which is a private connection.

In some embodiments, cloud computing resource 126 is a distributed system (e.g., remote environment) having scalable/elastic computing resources. In some embodiments, computing resources include one or more computing resources 128 (e.g., data processing hardware). In some embodiments, such resources include one or more storage resources 130 (e.g., memory hardware). The cloud computing resource 126 can perform processing (e.g., applying one or more machine learning models, applying one or more algorithms) of patient data (e.g., received from client system 102 or cloud computing system 112). In some embodiments, cloud computing system (e.g., 112) communicates with a cloud computing resource (e.g., 126) using an application programming interface.

In some embodiments, cloud computing resource 126 includes a database 134. In some embodiments, database 134 is external to (e.g., remote from) cloud computing resource 126. In some embodiments, database 134 is used for storing one or more of patient data, algorithms, machine learning models, or any other information used by cloud computing resource 126.

Figure 2:
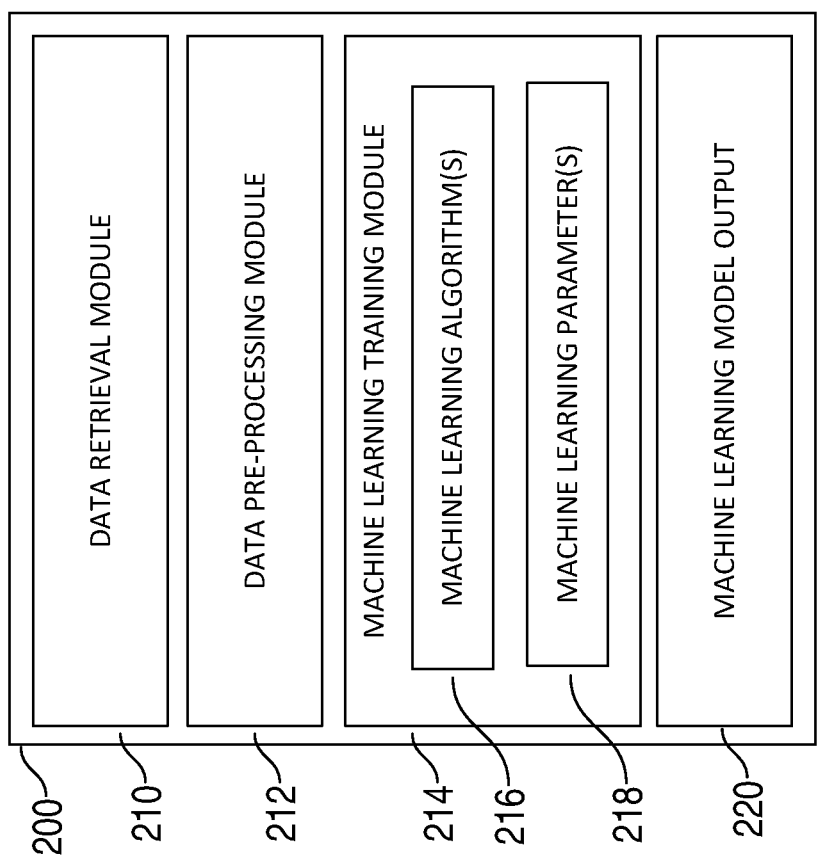
FIG. 2 illustrates an exemplary machine learning system in accordance with some embodiments.

FIG. 2 illustrates an exemplary machine learning system 200 in accordance with some embodiments. In some embodiments, a machine learning system (e.g., 200) is comprised of one or more electronic devices (e.g., 300). In some embodiments, a machine learning system includes one or more modules for performing tasks related to one or more of training one or more machine learning algorithms, applying one or more machine learning models, and outputting and/or manipulating results of machine learning model output. Machine learning system 200 includes several exemplary modules. In some embodiments, a module is implemented in hardware (e.g., a dedicated circuit), in software (e.g., a computer program comprising instructions executed by one or more processors), or some combination of both hardware and software. In some embodiments, the functions described below with respect to the modules of machine learning system 200 are performed by two or more electronic devices that are connected locally, remotely, or some combination of both. For example, the functions described below with respect to the modules of machine learning system 200 can be performed by electronic devices located remotely from each other (e.g., a device within system 112 performs data conditioning, and a device within system 126 performs machine learning training).

In some embodiments, machine learning system 200 includes a data retrieval module 210. Data retrieval module 210 can provide functionality related to acquiring and/or receiving input data for processing using machine learning algorithms and/or machine learning models. For example, data retrieval module 210 can interface with a client system (e.g., 102) or server system (e.g., 112) to receive data that will be processed, including establishing communication and managing transfer of data via one or more communication protocols.

In some embodiments, machine learning system 200 includes a data conditioning module 212. Data conditioning module 212 can provide functionality related to preparing input data for processing. For example, data conditioning can include making a plurality of images uniform in size (e.g., cropping, resizing), augmenting data (e.g., taking a single image and creating slightly different variations (e.g., by pixel rescaling, shear, zoom, rotating/flipping), extrapolating, feature engineering), adjusting image properties (e.g., contrast, sharpness), filtering data, or the like.

In some embodiments, machine learning system 200 includes a machine learning training module 214. Machine learning training module 214 can provide functionality related to training one or more machine learning algorithms, in order to create one or more trained machine learning models.

The concept of "machine learning" generally refers to the use of one or more electronic devices to perform one or more tasks without being explicitly programmed to perform such tasks. A machine learning algorithm can be "trained" to perform the one or more tasks (e.g., classify an input image into one or more classes, identify and classify features within an input image, predict a value based on input data) by applying the algorithm to a set of training data, in order to create a "machine learning model" (e.g., which can be applied to non-training data to perform the tasks). A "machine learning model" (also referred to herein as a "machine learning model artifact" or "machine learning artifact") refers to an artifact that is created by the process of training a machine learning algorithm. The machine learning model can be a mathematical representation (e.g., a mathematical expression) to which an input can be applied to get an output. As referred to herein, "applying" a machine learning model can refer to using the machine learning model to process input data (e.g., performing mathematical computations using the input data) to obtain some output.

Training of a machine learning algorithm can be either "supervised" or "unsupervised". Generally speaking, a supervised machine learning algorithm builds a machine learning model by processing training data that includes both input data and desired outputs (e.g., for each input data, the correct answer (also referred to as the "target" or "target attribute") to the processing task that the machine learning model is to perform). Supervised training is useful for developing a model that will be used to make predictions based on input data. An unsupervised machine learning algorithm builds a machine learning model by processing training data that only includes input data (no outputs). Unsupervised training is useful for determining structure within input data.

A machine learning algorithm can be implemented using a variety of techniques, including the use of one or more an artificial neural network, a deep neural network, a convolutional neural network, a multilayer perceptron, and the like.

Referring again to FIG. 2, in some embodiments, machine learning training module 214 includes one or more machine learning algorithms 216 that will be trained. In some embodiments, machine learning training module 214 includes one or more machine learning parameters 218. For example, training a machine learning algorithm can involve using one or more parameters 218 that can be defined (e.g., by a user) that affect the performance of the resulting machine learning model. Machine learning system 200 can receive (e.g., via user input at an electronic device) and store such parameters for use during training. Exemplary parameters include stride, pooling layer settings, kernel size, number of filters, and the like, however this list is not intended to be exhaustive.

In some embodiments, machine learning system 200 includes machine learning model output module 220. Machine learning model output module 220 can provide functionality related to outputting a machine learning model, for example, based on the processing of training data. Outputting a machine learning model can include transmitting a machine learning model to one or more remote devices. For example, a machine learning system 200 implemented on electronic devices of cloud computing resource 126 can transmit a machine learning model to cloud computing system 112, for use in processing patient data sent between client system 102 and system 112.

Figure 3:
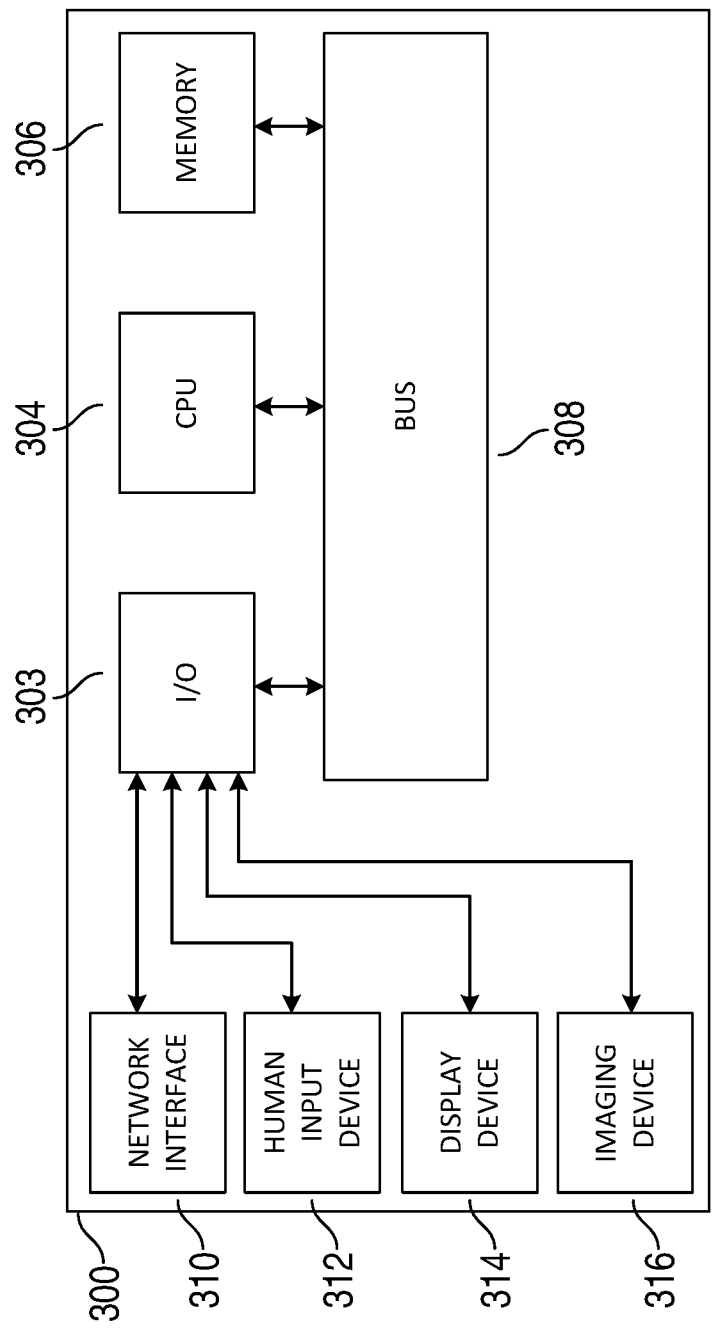
FIG. 3 illustrates an exemplary electronic device in accordance with some embodiments.

Attention is now directed to FIG. 3, which illustrates exemplary electronic device 300 which can be used in accordance with some embodiments. Electronic device 300 can represent, for example, a PC, a smartphone, a server, a workstation computer, a medical device, or the like. In some embodiments, electronic device 300 comprises a bus 308 that connects input/output (I/O) section 302, one or more processors 304, and memory 306. In some embodiments, electronic device 300 includes one or more network interface devices 310 (e.g., a network interface card, an antenna). In some embodiments, I/O section 302 is connected to the one or more network interface devices 310. In some embodiments, electronic device 300 includes one or more human input devices 312 (e.g., keyboard, mouse, touch-sensitive surface). In some embodiments, I/O section 302 is connected to the one or more human input devices 312. In some embodiments, electronic device 300 includes one or more display devices 314 (e.g., a computer monitor, a liquid crystal display (LCD), light-emitting diode (LED) display). In some embodiments, I/O section 302 is connected to the one or more display devices 314. In some embodiments, I/O section 302 is connected to one or more external display devices. In some embodiments, electronic device 300 includes one or more imaging device 316 (e.g., a camera, a device for capturing medical images). In some embodiments, I/O section 302 is connected to the imaging device 316 (e.g., a device that includes a computer-readable medium, a device that interfaces with a computer readable medium).

In some embodiments, memory 306 includes one or more computer-readable mediums that store (e.g., tangibly embodies) one or more computer programs (e.g., including computer-executable instructions) and/or data for performing techniques described herein in accordance with some embodiments. In some embodiments, the computer-readable medium of memory 306 is a non-transitory computer-readable medium. At least some values based on the results of the techniques described herein can be saved into memory, such as memory 306, for subsequent use. In some embodiments, a computer program is downloaded into memory 306 as a software application. In some embodiments, one or more processors 304 include one or more application-specific chipsets for carrying out the above-described techniques.

Figure 4:
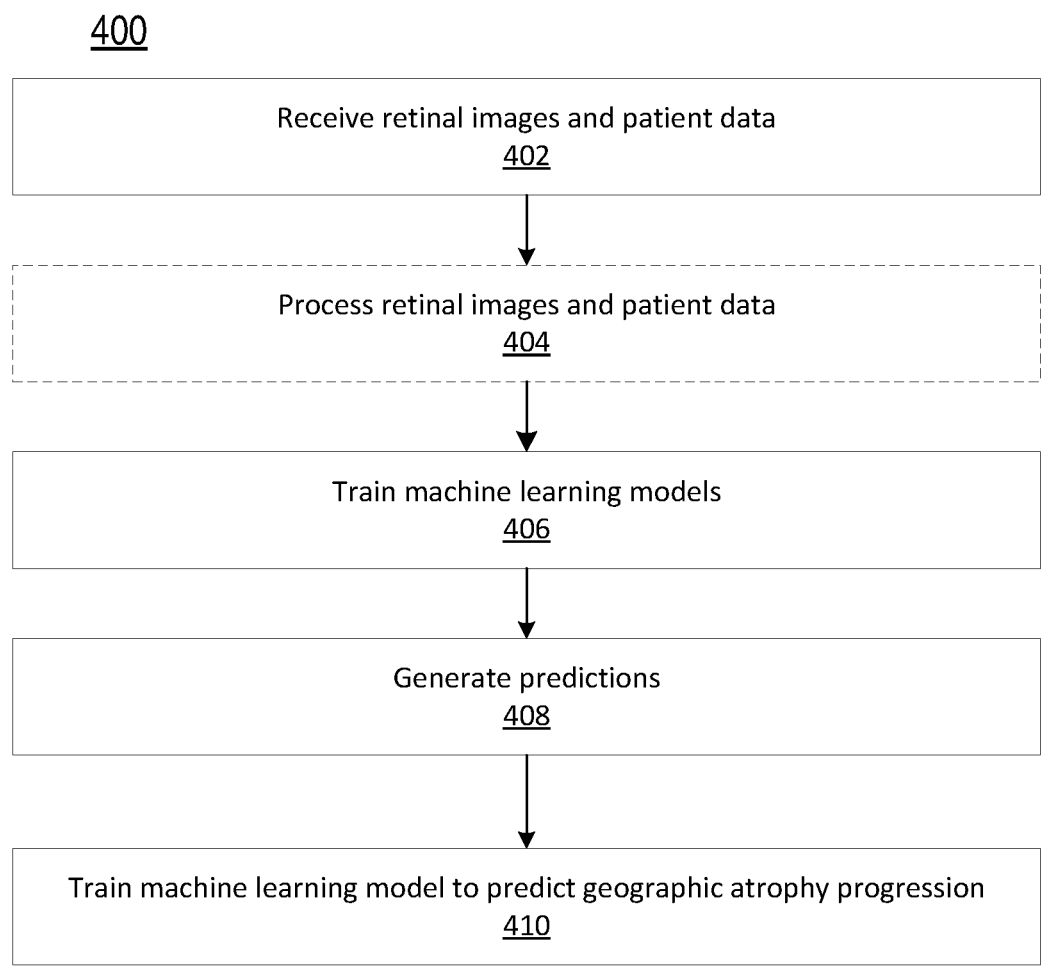
FIG. 4 illustrates an exemplary method for training a predictive machine learning model for geographic atrophy progression in at least one eye of a patient in accordance with some embodiments.

FIG. 4 illustrates an exemplary method for training a predictive machine learning model for geographic atrophy progression in at least one eye of a patient in accordance with some embodiments. Method 400 is merely exemplary. Thus, some operations in method 400 are, optionally, combined, the orders of some operations are, optionally, changed, and some operations are, optionally, omitted. In some embodiments, method 400 can be performed by a system having one or more features of system 200 shown in FIG. 2. For example, one or more blocks of process 400 can be performed by system 200.

At block 402, a computing system (e.g., system 200) receives retinal images and patient data corresponding to the retinal images from one or more databases (e.g., 134). In some embodiments, the retinal images and patient data have been captured from one or more patients in clinical or non-clinical settings at various points in time. In some embodiments, the computing system consolidates (e.g., combines, groups, selects, includes, etc.) the retinal images and patient data into different groups. In some embodiments, the computing system consolidates a large number (e.g., a million) retinal images and patient data from a large number of databases into a single group. A group of retinal images (e.g., "group") includes retinal images of one or more types of retinal images and patient data corresponding to the retinal image. A type of retinal image includes, for example, autofluorescence (FAF) retinal images, infrared (IR) retinal images, Color fluorescent protein (CFP) retinal images, Spectral domain-optical coherence tomography (SD-OCT) retinal images, etc.

Figure 5:
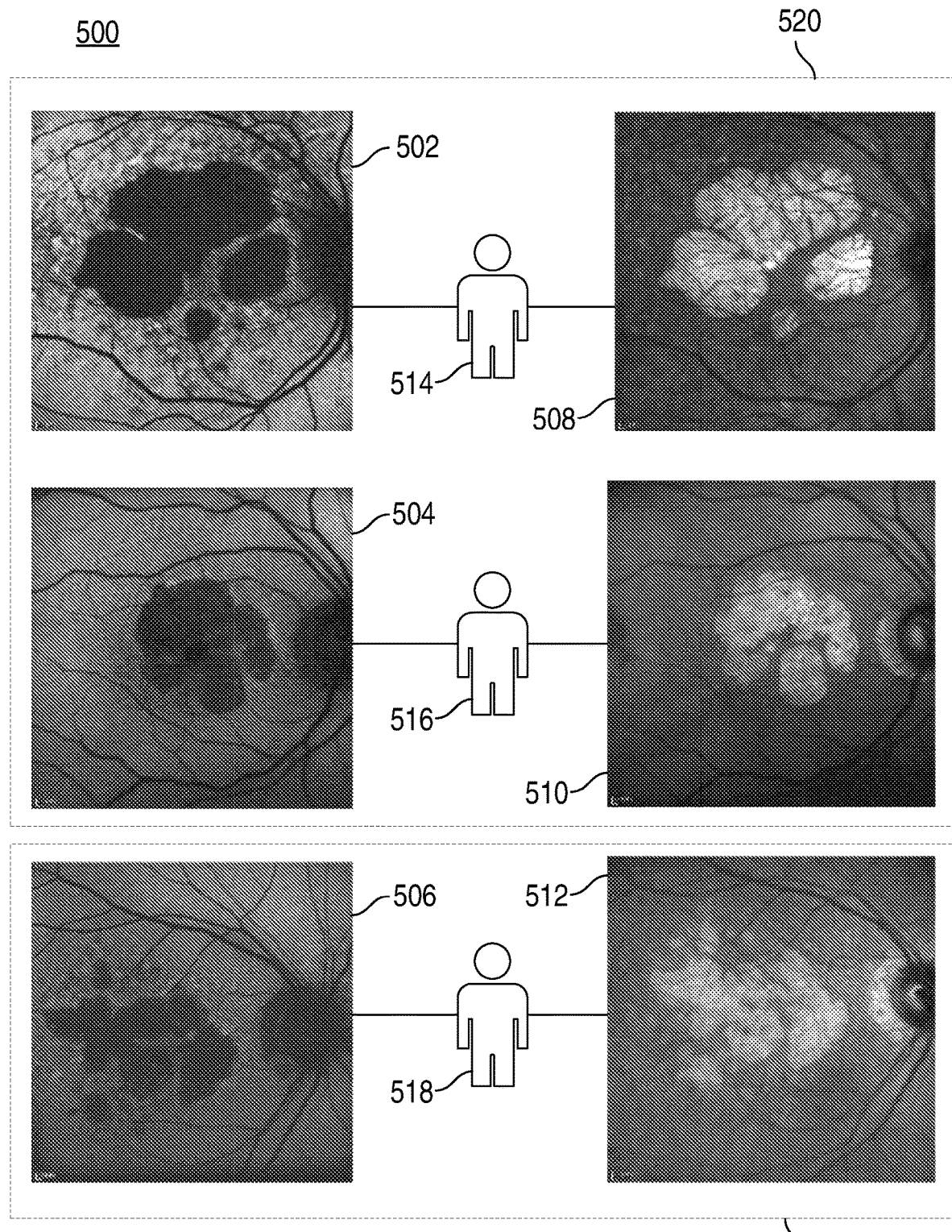
FIG. 5 illustrates an exemplary group of retinal images in accordance with some embodiments.

Turning to FIG. 5, a group of retinal images (i.e., group 500) in accordance with some embodiments is shown. Group 500 includes FAF images 502, 504, and 506; and IR images 508, 510, 512. In some embodiments, group 500 includes one or more other types of retinal images, such as CFP retinal images, etc. In some embodiments, group 500 includes only one type of retinal image.

As shown in FIG. 5, the FAF images and IR images belong to a particular patient (e.g., patients 514, 516, and 518). FAF image 502 and IR image 508 belong to patient 514; FAF image 504 and IR image 510 belong to patient 516; and FAF image 506 and IR image 512 belong to patient 518. Group 500 includes retinal images (e.g., FAF image 502) of an eye captured at the macula. In some embodiments, group 500 includes retinal images captured at one or more other positions, such as temporal to macula, nasal to macula, superior to macula, inferior to macula, or the like positions. In some embodiments, different types of retinal images belong to the same patient.

Accordingly, FIG. 5 shows three collections of retinal images (e.g., FAF image 502 and IR image 508 belong to patient 514; FAF image 504 and IR image 510 belong to patient 516; and FAF image 506 and IR image 512 belong to patient 518). A collection of retinal images (e.g., collection) is a set of two or more images that capture the same eye of the same patient at the same position during the same timeframe. In addition to the collections, group 5 also includes subsets of retinal images ("subsets"). The subsets include subset 520 (that includes FAF images 502 and 504 and IR images 508 and 510) and subset 522 (e.g., FAF image 506 and IR 512). While FIG. 5 shows subsets 520 and 522 as having the same number of images, subsets 520 and 522 includes different numbers of retinal images in some embodiments. Group 500, subsets 520, and/or 522 also include, in some embodiments, only one type of retinal images (e.g., FAF images or IR images). Groups, subsets, and collections are used for training machine learning models.

Turning to FIG. 6, exemplary patient data 600 in accordance with some embodiments is shown. Patient data 600 includes patient identifier (id) 602, age 604, eye position 608, and actual lesion sizes at 6-months (e.g. 610), 12 months (e.g., 612), 18 months (e.g., 614), and 24 months (e.g., 616) for the baseline retinal images (e.g., retinal images shown in FIG. 5). Lesion size is measured in the units of $mm^2$. In some embodiments, lesion size is measured in one or more different units. It should be understood that patient data 600, as shown in FIG. 6, is not an exhaustive list of patient data. In some embodiments, patient data includes one or more of laterality, longitudinal data on visual acuity, patient characteristics (e.g., weight, sex, other patient data), or any other data descriptive of a particular patient. Moreover, in some embodiments, patient id's 614, 616, and 618 shown in FIG. 6 can correspond to patients 514, 516, and 518 shown in FIG. 5.

As shown in FIG. 6, some patient data 600 is not available (e.g., unavailable, inaccessible, not able to be retrieved, or the like) to the computing system. Patient data 600 that is not available is denoted as "–" in a corresponding field in the table. In some embodiments, one or more indications of geographic atrophy progression are derived from patient data 600. For example, a lesion growth rate is derived from patient 600 by comparing the actual lesion sizes for a particular patient. For example, patient id 618 has an actual lesion growth rate (e.g., geographic atrophy progression) of 0.9 $mm^2$ at 12 months. The computing system, in some embodiments, calculates an actual lesion growth rate for patient 618 at 12 months by subtracting the actual lesion size at 12 months from the actual lesion size at 6 months (e.g., 3.4 $mm^2$–2.35 $mm^2$). In some embodiments, a lesion growth rate of 0.9 $mm^2$ denotes a "slow" geographic atrophy progression because the lesion growth rate is under a predetermined lesion growth threshold value (e.g., 0.13 $mm^2$). However, in other embodiments, if the lesion growth rate was above the predetermined threshold value, the lesion growth rate would denote a "fast" geographic atrophy progression.

Turning back to FIG. 4, at block 404, the computing system, optionally (as denoted by the dashed border of the block), processes the retinal images and patient data. In some embodiments, the retinal images and patient data are preprocessed. Therefore, in these embodiments, the computing system skips applying one or more exemplary processing techniques as disclosed herein or generally known in the art.

In some embodiments, the computing system links patient data (e.g., patient data 600) and retinal images (e.g., retinal images 502-512). In some of these embodiments, the computing system parses a file path to the retinal images. In some of these embodiments, the file path includes one or more of patent data 600 (e.g., 602-616). In some embodiments, the computing system identifies other patient data, such as sensory modality and laterality. In some of these embodiments, the computing system identifies the modality and/or laterality based on the file path. In some these embodiments, the computing system identifies the other patient data based on optical character recognition. In some examples, the computing system uses one or more other techniques to assist with linking the patient data to the retinal images and/or one or more other data linking techniques known in the art.

In some embodiments, the computing system identifies the type of retinal image that corresponds to the retinal image. In some of these embodiments, the computing system uses image processing to distinguish different types of retinal images (e.g., distinguishing CFP retina images, FAF images, IR images, and black and white images).

In some embodiments, the computing system consolidates the patient data and retinal images based on the type of retinal image and/or lesion size. For example, the computing system consolidates one or more FAF retinal images and patient data corresponding to patients who have a "fast" geographic atrophy progression, using the techniques as described above in relation to FIG. 6. The computing system, in some of these embodiments, consolidates the retinal images into different groups, subsets, and collections based on the type of retinal images, whether the retinal images belong to a particular one or more patients, whether retinal images were captured during a particular time period, etc.

In some embodiments, the computing system normalizes one or more of the retinal images. For example, a group includes different-sized retinal images. Thus, in some embodiments, the computing system normalizes the retinal images prior to training the machine learnings models in block 406. In some embodiments, the computing system will select a retinal image from the group. In accordance with a determination that the height of the retinal image is less than the width of the retinal image, in some of these embodiments, the computing system removes the edges of the retinal images. In some embodiments, removing the edges of the retinal images (e.g., four edges of a quadrilateral retinal image) includes removing a portion the retinal image that includes removing pixels at the edge of the retinal image to pixels towards the middle of the retinal image. In some embodiments, after removing an edge of the retinal image a new edge of the retinal image is created. After removing the edges, in some of these embodiments, the computing system pads the retinal image. For example, padding the retinal image includes adding space between the content of the retinal image and the border of the retinal image (e.g., new edges of the retinal image). In some embodiments, the computing system, after padding the retinal image, the computing system resizes the retinal image to a predetermined image size. A predetermined image size includes one or more of 224 pixels×224 pixels, 229 pixels×229 pixels, 331 pixels×331 pixels, etc. In some embodiments, the predetermined image size is determined based on the type of machine learning model that is trained in block 406 below.

In some embodiments, in accordance with a determination that the height of the retinal image is not less than the width of the retinal image, the computing system removes a portion of the retinal image. In some of these embodiments, a portion of the retinal image includes one or more of the bottom banner (e.g., part of the retinal image that contains writing), the top banner, the side banner, or any other obstruction or characteristic of the retinal image that covers up or does not represent the pixels of the eye of a patient. In some embodiments, a banner contains patient data and/or data concerning descriptive information on the retinal image. In some embodiments, the computing system resizes the first retinal image to the predetermined size.

In some embodiments, the computing system consolidates the retinal images and patient data by organizing them into groups to train a machine learning model. In some embodiments, the computing system selects retinal images captured during a clinical or non-clinical visit for a particular patient. In some of these embodiments, the retinal images were captured within a year from a predetermined timeframe (e.g., a particular date, 6-months, 12-months, 18-month, etc.).

In some embodiments, the computing system consolidates the retinal images into a group (e.g., a group for training the machine learning model) based on a set of criteria being met. In of these some embodiments, the criteria includes a criterion that is met when the time of the capturing of the retinal image is known, an actual lesion size for an eye of a patient associated with the retinal image is available (e.g., the patient whose eye is captured in the image), and the patient associated with the retinal image has a retinal image for a particular eye (e.g., the eye where the lesion size is known) that exist within a predetermined timeframe (e.g., 6-months, 12-months, 18-months, etc.). In some of these embodiments, the computing system consolidates the retinal images into group for training when the set of criteria are met. In some of these embodiments, the computing system forgoes consolidating the retinal images into the group for training when the criteria are not met. In some embodiments, the computing system uses one or more other criteria, such as whether the patient age being greater (or lesser) than another age, whether an actual lesion size for a particular patient is within a particular range of lesion sizes (e.g., larger lesions sizes), etc., alone or in combination with this criterion, to group the retinal images into a group for training a machine learning model.

At block 406, the computing system trains one or more machine learning models (e.g., models). For example, the computing system trains models based on one or more groups of the retinal images and patient data received at block 402. In some embodiments, the computing system trains models based on a first group. In some embodiments, the first group includes retinal images of a first type of retinal image (e.g., FAF retinal images). In some of these embodiments, the computing system trains models based on a second group (e.g., IR retinal images). In some embodiments, the second group includes retinal images that are a second type of retinal images (e.g., IR retinal images) that is different from the first type of retinal image (e.g., FAF retinal images).

The computing system trains one or more models with one or more machine learning algorithms. In some embodiments, a machine learning algorithm includes a supervised machine learning algorithm. In some embodiments, the machine learning algorithm includes one or more convolution neural networks. For example, in some embodiments, the machine learning algorithm includes one or more of ResNet-101, ResNet-152, ResNet-101, ResNet-152, VGG-16, VGG-19, Inception-v4, and NASNet. In some embodiments, the machine learning algorithm includes one or more variants of the machine learning algorithm that has strong regularization (strong reg.). In some embodiments, the computing system fuses two or more of the machine learning algorithms (e.g., ResNet-101+ResNet-152), where the "+" indicates that ResNet-101 is fused with the ResNet-152. The fused algorithms also include variants that have strong regularization (e.g., ResNet-101+ResNet-152 (strong reg.)). In some embodiments, the machine learning algorithm is already fused before training.

Figure 7:
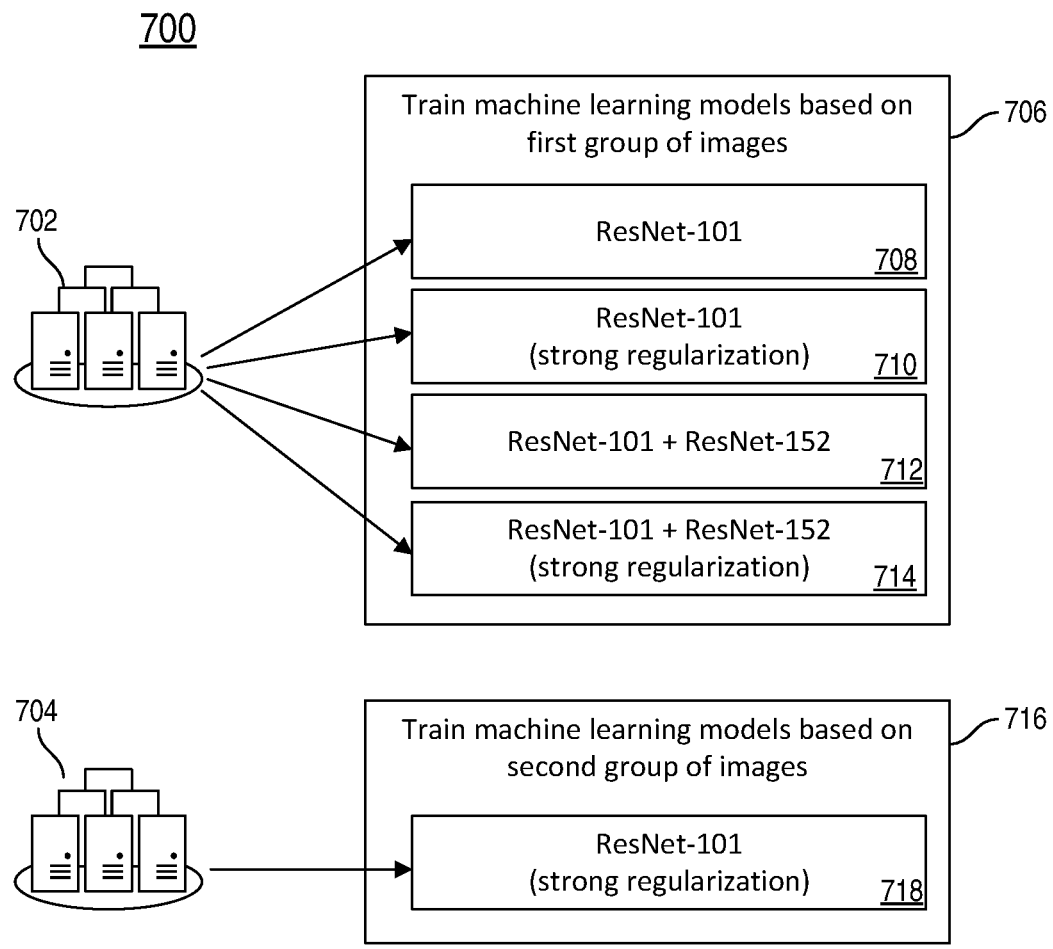
FIG. 7 illustrates an exemplary method for training one or more machine learning models in accordance with some embodiments.

FIG. 7 illustrates an exemplary method for training one or more machine learning models in accordance with some embodiments. Method 700 is merely an exemplary embodiment of block 406 in FIG. 4. Thus, some operations in method 700 are, optionally, combined, the orders of some operations are, optionally, changed, and some operations are, optionally, omitted. In some embodiments, method 700 can be performed by a system having one or more features of system 200 shown in FIG. 2. For example, one or more blocks of process 700 can be performed by system 200.

FIG. 7 shows a first group 702 (e.g., FAF images) and a second group (e.g., IR images) 704. In some embodiments, the first group 702 and the second group 704 include different numbers of retinal images (e.g., groups are a different size); in other embodiments, the first and second groups include the same numbers of retinal images (e.g., groups are the same size). In some embodiments, the computing system, at block 404, consolidates the first group 702 and the second group 704 by taking a portion of the retinal images received at block 402. For example, the computing system selects a portion (e.g., eighty percent) of the retinal images received at block 402. After selecting the portion (e.g., eighty percent) of the retinal images received at block 402, the computing system consolidates FAF images in the portion of the retinal images into the first group 702 and IR images of the portion of retinal images into the second group 704.

At block 706, the computing system trains four machine learning models based on the first group 702 (e.g., FAF images) and patient data corresponding to the first group. As shown in block 706, the computing system trains a ResNet-101 machine learning model 708. In some embodiments, the computing system trains the ResNet-101 machine learning model 708 using a ResNet-101 machine learning algorithm. The computing system also trains a ResNet-101 (strong reg.) machine learning model 710. In some embodiments, the computing system trains the ResNet-101 (strong reg.) machine learning model 710 using a ResNet-101 (strong reg.) machine learning algorithm. In addition, the computing system trains a ResNet-101+ResNet-152 machine learning model 712. In some embodiments, the computing system trains the ResNet-101+ResNet-152 machine learning model 712 using a ResNet-101+ResNet-152 machine learning algorithm. Further, the computing system trains a ResNet-101+ResNet-152 (strong reg.) machine learning model. In some embodiments, the computing system trains the ResNet-101+ResNet-152 (strong reg.) machine learning model 714 using a ResNet-101+ResNet-152 (strong reg.) machine learning algorithm.

At block 716, the computing system trains a ResNet-101 (strong reg.) machine learning model 718. In some embodiments, the computing system trains the ResNet-101 (strong reg.) machine learning model using a ResNet-101 (strong reg.) machine learning algorithm based on the second group of images 704 (e.g., IR images) and patient data corresponding to the second group of images.

In some embodiments, the computing system trains one or more of the machine learning models in block 706 and 716 in parallel, series, or a combination of both. It should be understood that the machine learning models trained in blocks 706 and 716 are trained using convolutional neural networks that require a supervised learning technique. Because the machine learning models trained in blocks 706 and 716 require a supervised learning technique, in some embodiments, the computing system uses a portion of the patient data, such as an actual lesion size, to train each machine learning model. In some embodiments, the computing system trains the machine learning models in FIG. 7 by feeding a baseline retinal image (e.g., FAF image at block 706 or IR image at block 716) into each machine learning algorithm to train the machine learning model to predict geographic atrophy progression in patients based on an excepted result that corresponds to the actual lesion size (e.g., 610-616 in FIG. 6).

Turning back to FIG. 4, at block 408, the computing system generates one or more predictions of geographic atrophy progression. In some embodiments, the computing system generates the one or more predictions using one or more of the trained machine learning models at block 406. In some embodiments, the computing system generates a first one or more predictions based on a first subset of retinal image (e.g., one or more FAF images) and generates a second one or more predictions based on a second subset of retinal image (e.g., one or more IR images). In some embodiments, the first subset of retinal images includes a first subset of retinal images and the second subset of retinal images include a second type of retinal image.

To generate the predictions, the computing system uses subsets for a group of images (e.g., third group) that is different from the groups of images (e.g., first and second groups) used in block 406. In some embodiments, the computing system will not use the subsets from the third group of images to train any machine learning models prior to generating the one or more predictions. In some embodiments, the computing system continues to train the machine learning models while generating the predictions.

At block 410, the computing system trains a machine learning model to predict a geographic atrophy progression in at least one eye of the patient. In some embodiments, the machine learning model is trained using one or more of multilayer perceptron algorithms. In some embodiments, the computing system trains the machine learning model based on the first predictions, the second predictions, the first and second subsets of retinal images, and patient data corresponding to the first and second subsets of retinal images, (e.g., age and actual lesion size). In some embodiments, the third group at block 406 is the same as the third group of images described at block 410.

In some embodiments, while training the machine learning model, the computing system identifies a phenotype cluster (e.g., residual feature) that corresponds to a shape complexity of a lesion that is undergoing geographic atrophy and a phenotype cluster that corresponds to a size of a lesion that is undergoing geographic atrophy. In some of these embodiments, these phenotype clusters have a strong relation to identifying geographic atrophy progression in at least one eye of the patient. In some embodiments, the computing system identifies one or more phenotype clusters using a t-Distributed stochastic neighbor embedding (t-Sine) technique.

In some embodiments, while training the machine learning model, the computing system identifies a phenotype cluster that corresponds to a surrounding of a lesion that is undergoing geographic atrophy. In some of these embodiments, the third phenotype cluster has a weak correlation to identifying geographic atrophy progression in at least one eye of the patient.

Figure 8:
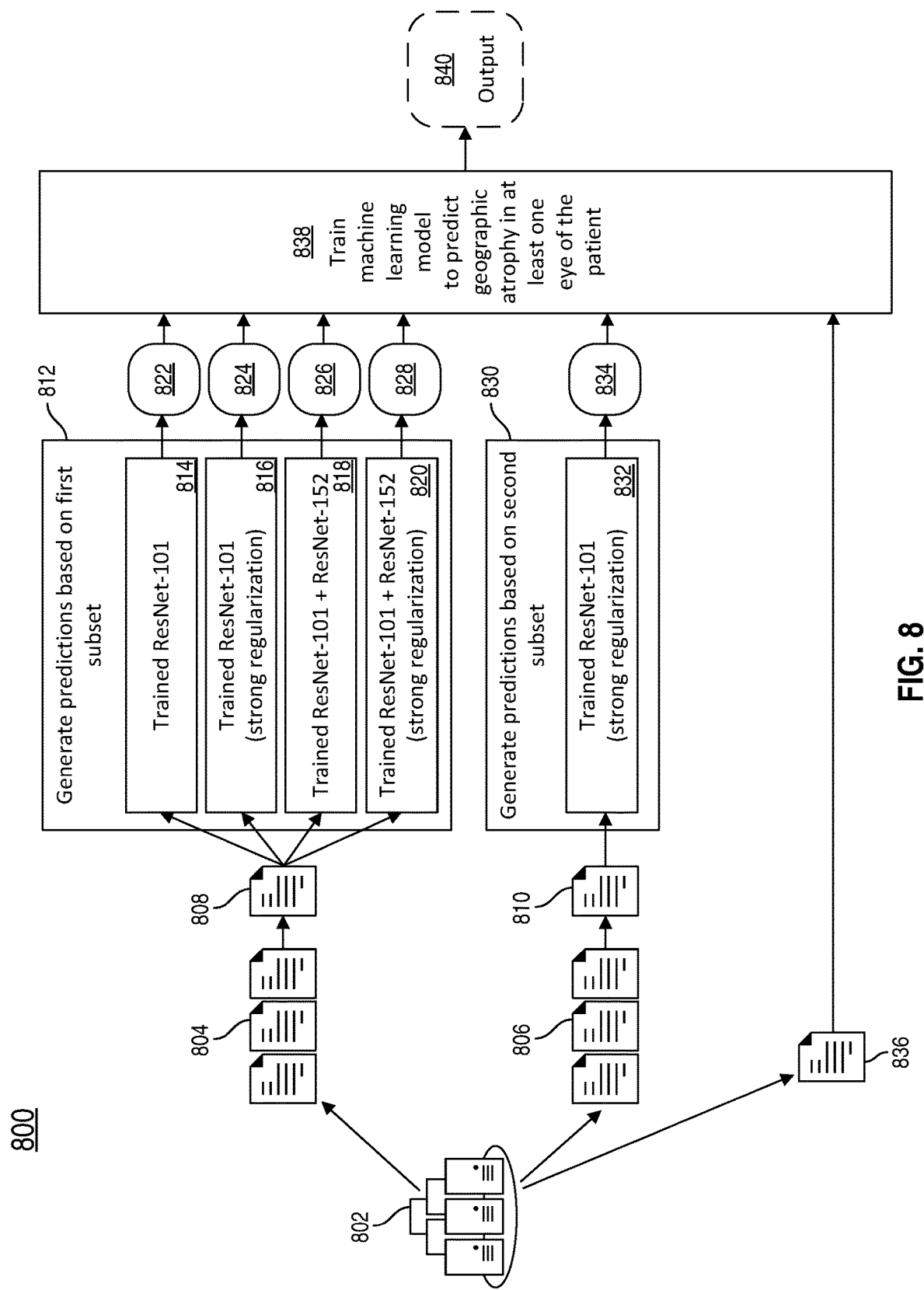
FIG. 8 illustrates an exemplary method for training a predictive machine learning model for geographic atrophy progression in at least one eye of a patient in accordance with some embodiments.

FIG. 8 illustrates an exemplary method for training a predictive machine learning model for predicting geographic atrophy progression in at least one eye of a patient in accordance with some embodiments. Method 800 is merely an exemplary embodiment of blocks 408 and 410 in FIG. 4. Thus, some operations in method 800 are, optionally, combined, the orders of some operations are, optionally, changed, and some operations are, optionally, omitted. In some embodiments, method 800 can be performed by a system having one or more features of system 200 shown in FIG. 2. For example, one or more blocks of process 800 can be performed by system 200.

FIG. 8 shows a group 802. The group includes a first subset of retinal images 804 (e.g., FAF images) and a second set of retinal images 806 (e.g., IR images). In some embodiments, the first subset 804 has the same number of retinal images as the second subset 806. Group 802 includes collections of retinal images (e.g., a collection that includes FAF image 808 and IR 810).

As shown in FIG. 8, at block 812, the computing system uses trained machine learning models 814, 816, 818, and 820 to generate predictions 822, 824, 826, and 828 based on retinal image 808 from the first subset 804 of the group of retinal images 802. The trained machine learning models 814, 816, 818, and 820 correspond to the machine learning models 708, 710, 712, and 714 trained at block 706. Similarly, the computing system, at block 830, uses trained machine learning model 832 to generate prediction 834 based on retinal image 810 from the second subset 806 of the group of retinal images 802. The trained machine learning model 834 corresponds to the machine learning model 718 trained at block 716. Further, as shown in FIG. 8, patient data 836 is shown. Patient data is an age of the patient. In some embodiments, patient data includes other types of patient data as disclosed herein (e.g., FIG. 6).

At block 838, the computing system trains a model to predict geographic atrophy progression (or the lesion growth rate at follow-up visits) in at least one eye of the patient. With each iteration, as depicted, the computing system trains the machine learning model to predict geographic atrophy progression in at least one eye of the patient using four predictions from the trained machine learning models based on the first subset (e.g., 814, 816, 818, and 820), one prediction based on the second subset (e.g., 832), and an age of the patient (e.g., 836). It should be understood that only one iteration of training the machine learning model is shown in FIG. 8. Thus, after training the machine learning algorithm in the manner described above in FIG. 8 using group 802 through many iterations and collections of retinal images, the computing system trains a model to predict geographic atrophy progression in at least one eye of the patient. In some embodiments, the machine learning model to predict geographic atrophy progression in at least one eye of the patient requires a supervised learning technique. Therefore, in some embodiments, the computing system uses a portion of the patient data, such as lesion size, to train the machine learning model to predict geographic atrophy progression in at least one eye of the patient. In some embodiments, the computing system trains the machine learning model in FIG. 8 by comparing the output of the machine learning model to predict geographic atrophy progression in at least one eye of the patient to an expected result that corresponds to the actual lesion size (e.g., 610-616 in FIG. 6) that is associated with the collection retinal images 808 and 810. In some embodiments, the machine learning model is trained at block 838 using a multilayer perceptron algorithm.

At block 840, the computing system, optionally, uses the machine learning model to determine geographic atrophy progression in at least one eye of the patient.

FIGS. 9A-9G illustrate exemplary user interfaces in accordance with some embodiments. The user interface in these figures is used to illustrate the processes described below, including the processes in FIG. 10

Figure 9A:
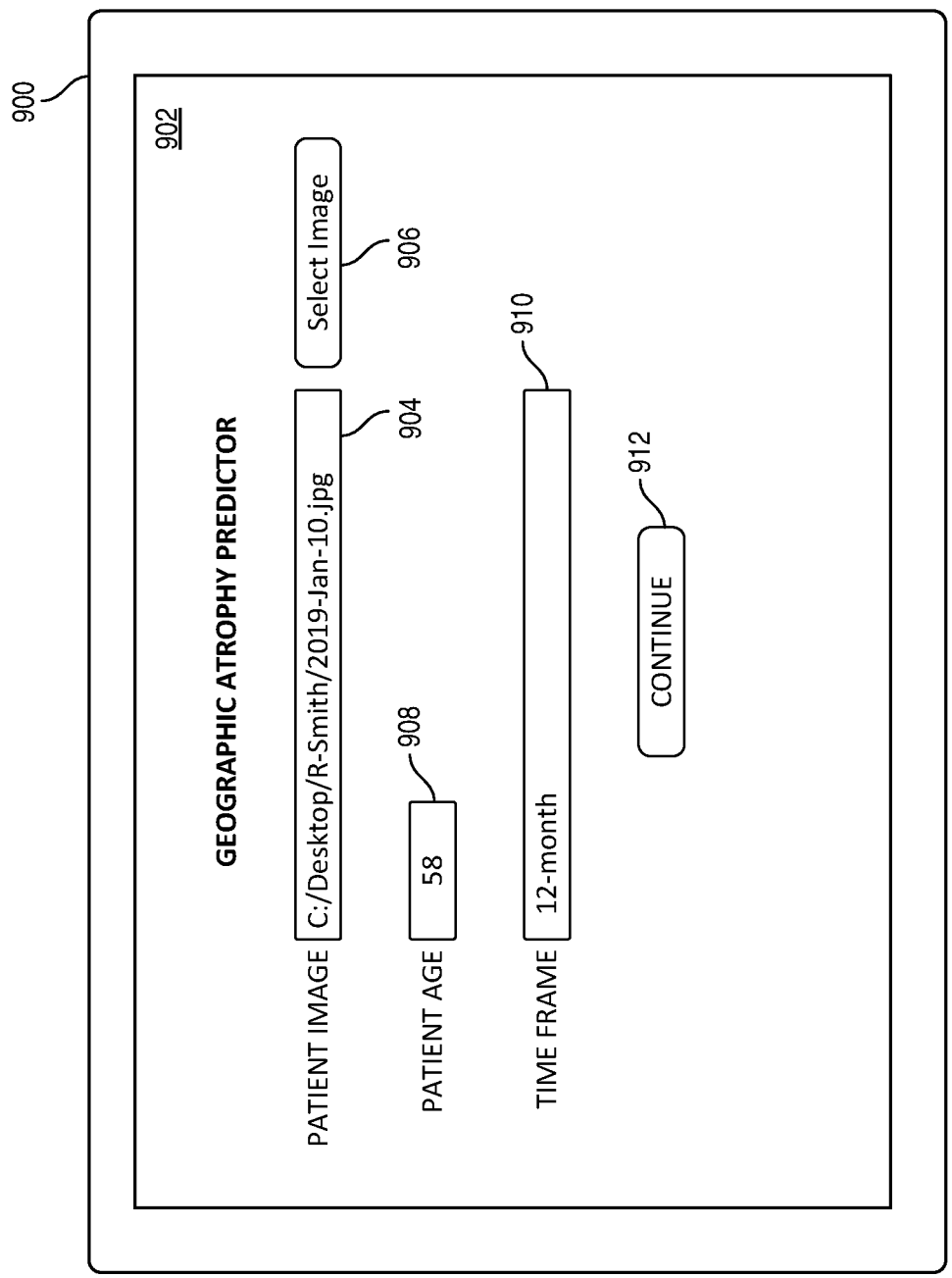
FIGS. 9A-9H illustrate exemplary user interfaces in accordance with some embodiments.

FIG. 9A illustrates a computing system (e.g., client system 104) for controlling a user interface 900 in accordance with a prediction of geographic atrophy progression in at least one eye of a patient. In some embodiments, the computing system includes one or more features of system 100. The computing system displays user interface 900 that includes a canvas 902. Canvas 902 includes image input 904, image selection affordance 906, patient age input 908, timeframe input 910, and submission affordance 912. In some embodiments, canvas 902 does not include one or more features in FIG. 9 (e.g., canvas 902 does not include timeframe input 910).

In some embodiments, the computing system receiving user input (e.g., on image selection input) corresponding to a selection of one or more retinal images (e.g., IR images and FAF images 502-512). In some of these embodiments, the computing system receives a new file path to retrieve one or more retinal images by activating image selection affordance 906 and selecting a retinal image from one or more systems and/or devices in system 100.

Figure 9B:
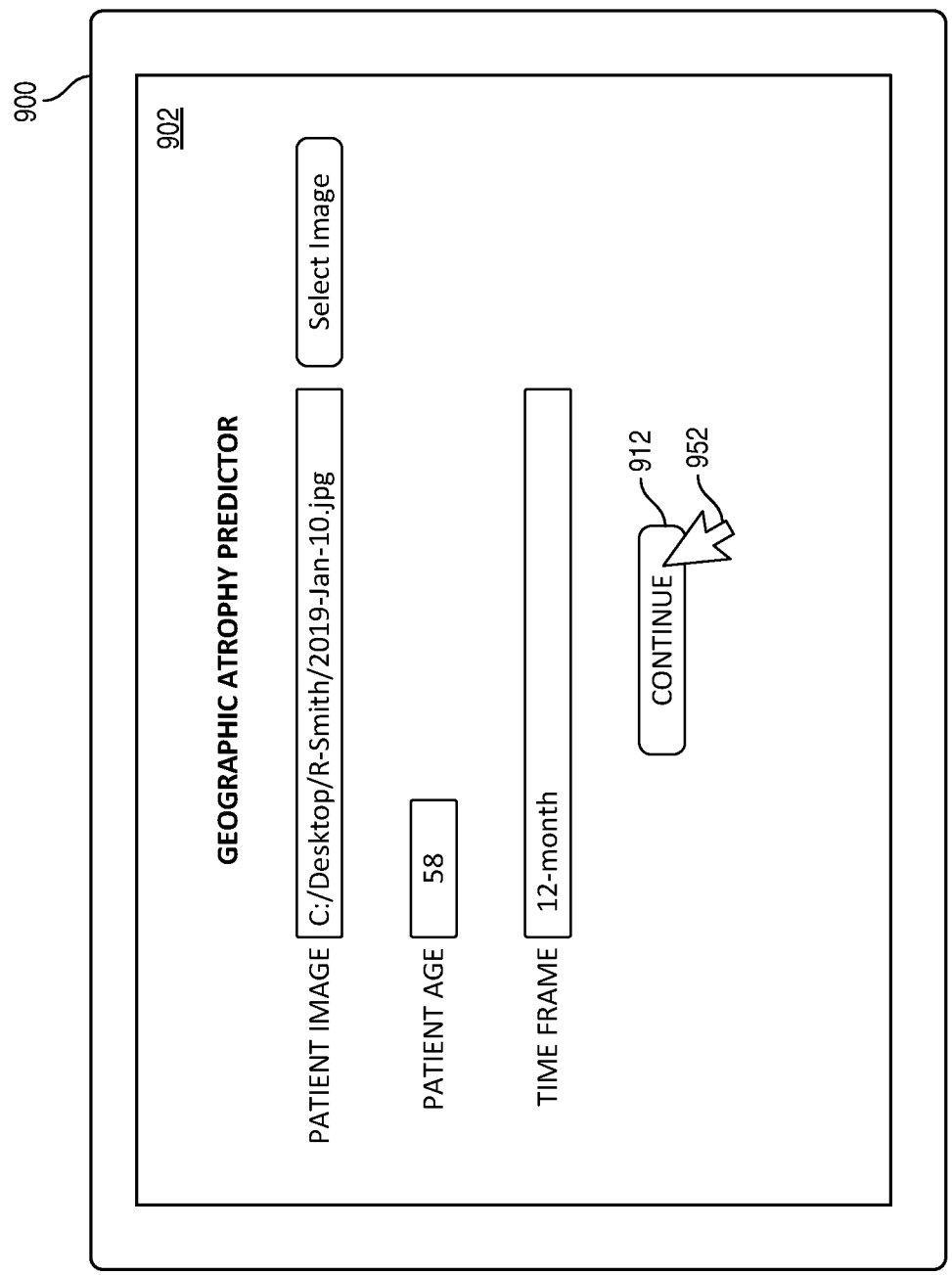

As illustrated in FIG. 9B, the computing system receiving user input 952 (e.g., on submission affordance 912) corresponding to one or more retinal images (e.g., file path in image input 904) and patient data (e.g., age in patient age input 908) (e.g., patient data 600). The computing system, in some embodiments, retrieves the one or more retinal images from the file path in image input 904.

Subsequent to receiving the user input corresponding to one or more retinal images and patient data, the computing system receives a prediction of geographic atrophy progression in at least one eye of the patient. In some embodiments, the prediction (e.g., output 840) is determined by an algorithm (e.g., trained machine learning model 838) based on the one or more retinal images and patient data.

In some embodiments, the computing system receives user input 952 (e.g., on submission affordance 912) corresponding to receiving a prediction timeframe (e.g., denoted as 12-month in timeframe input 910) before receiving the prediction of geographic atrophy progression in at least one eye of the patient. In some embodiments, the prediction (e.g., output 840), is determined based on the prediction timeframe. In some embodiments, the prediction is determine on a monthly timeframe and the computing system does not receive a prediction timeframe.

Figure 9C:
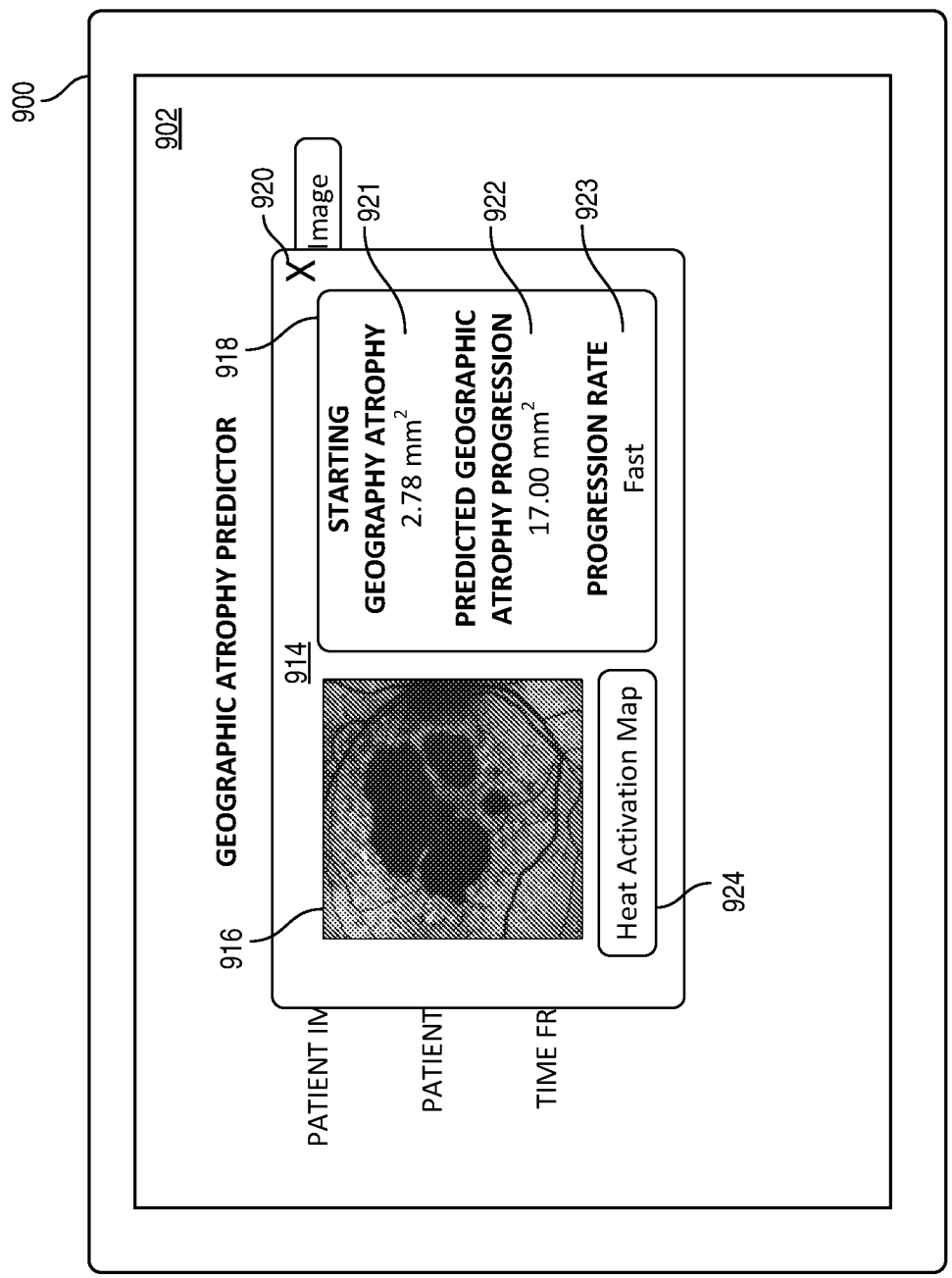

As illustrated in FIG. 9C, the computing system displays user interface 900 that displays canvas 914 that includes a retinal image 916 (e.g., 502), notification 918, exiting affordance 920, and map affordance 924.

Subsequent to receiving the prediction of geographic atrophy progression in at least one eye of the patient, the computing system outputs a notification 918 based on the prediction of geographic atrophy progression. Notification 918 includes a starting geographic atrophy 921, a predicted geographic atrophy progression 922, and a geographic atrophy progression rate 923. In some embodiments, one or more of these features are not output in notification 918. In some embodiments, the geographic atrophy progression rate 923 is displayed based on the comparison of the geographic atrophy progression prediction to a predetermined progression threshold value. In some embodiments, the computing system receives user input on exiting affordance 920, and the computing system ceases to display canvas 914.

Figure 9D:
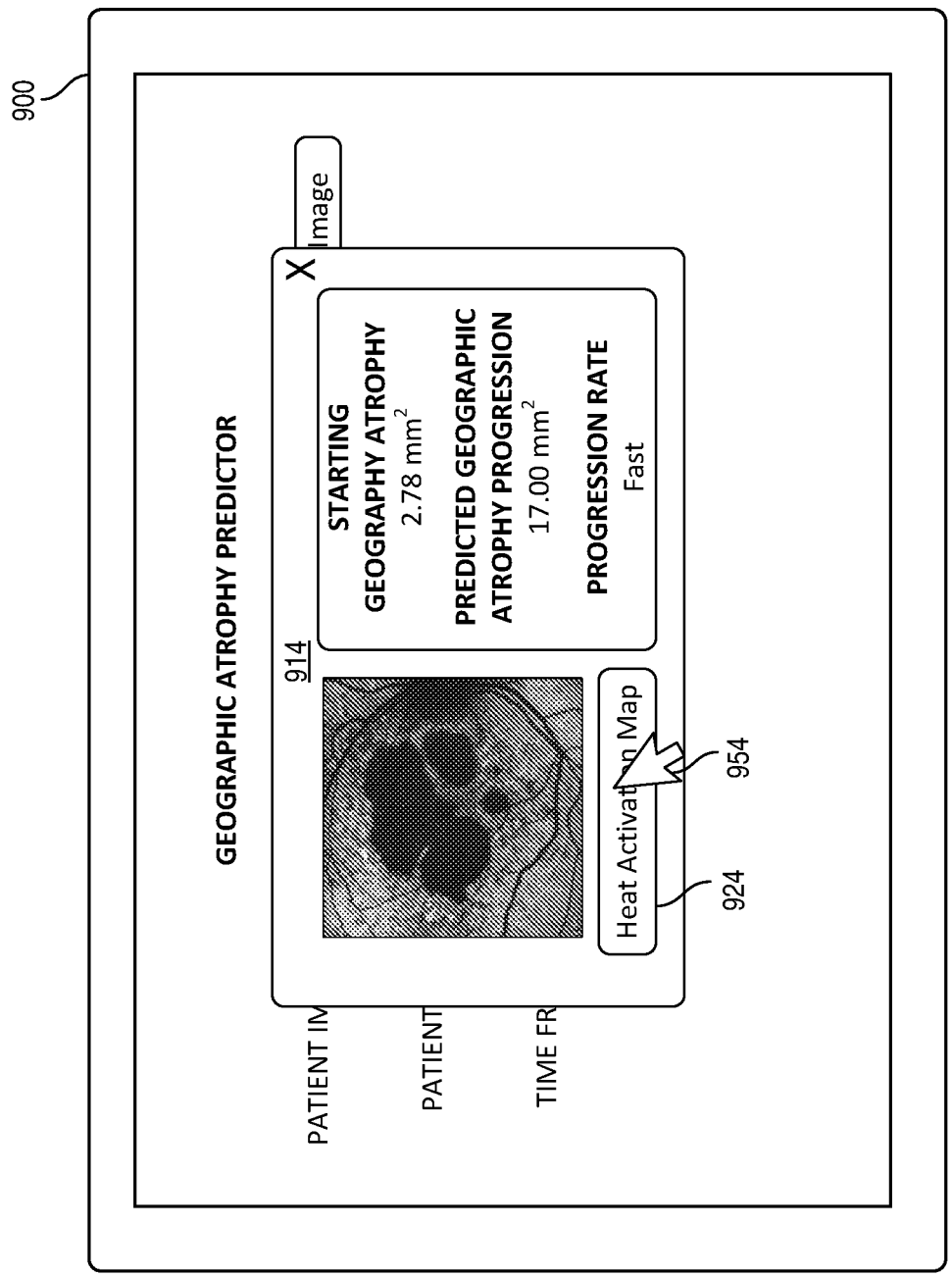
Figure 9E:
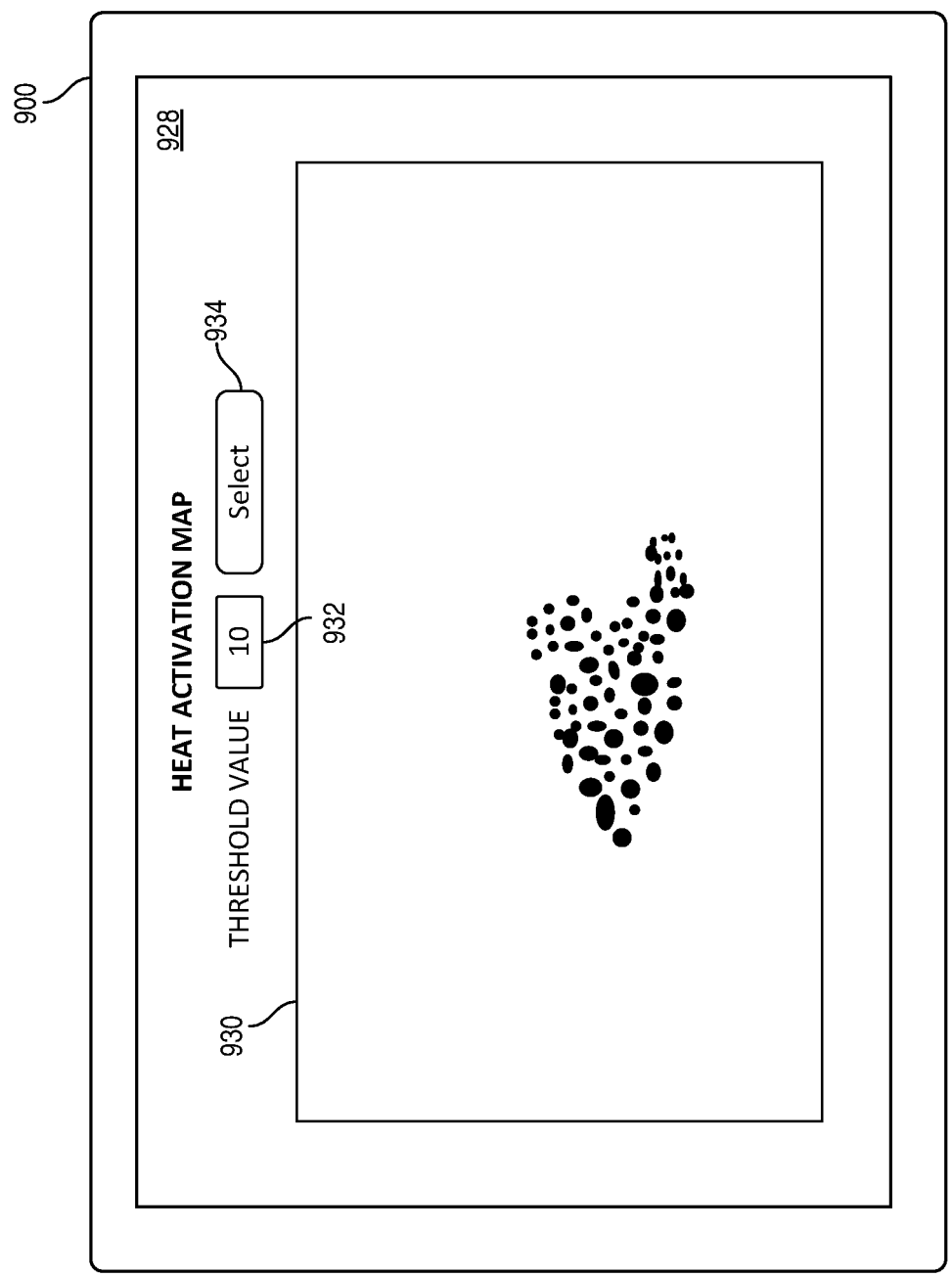

As illustrated in FIG. 9D, the computing system receives user input 954 (e.g., on heat activation map affordance 924) corresponding to a request to output a heat activation map. In response to receiving user input 954 corresponding to the request to output a heat activation map, the computing system displays canvas 928 and ceases to display canvas 914. Canvas 928 includes heat activation map 930, threshold value input 932, and threshold selection affordance 934 as shown in FIG. 9E. The computing system displays the heat activation map 930 based on the threshold value as denoted in the threshold value input 932.

Figure 9F:
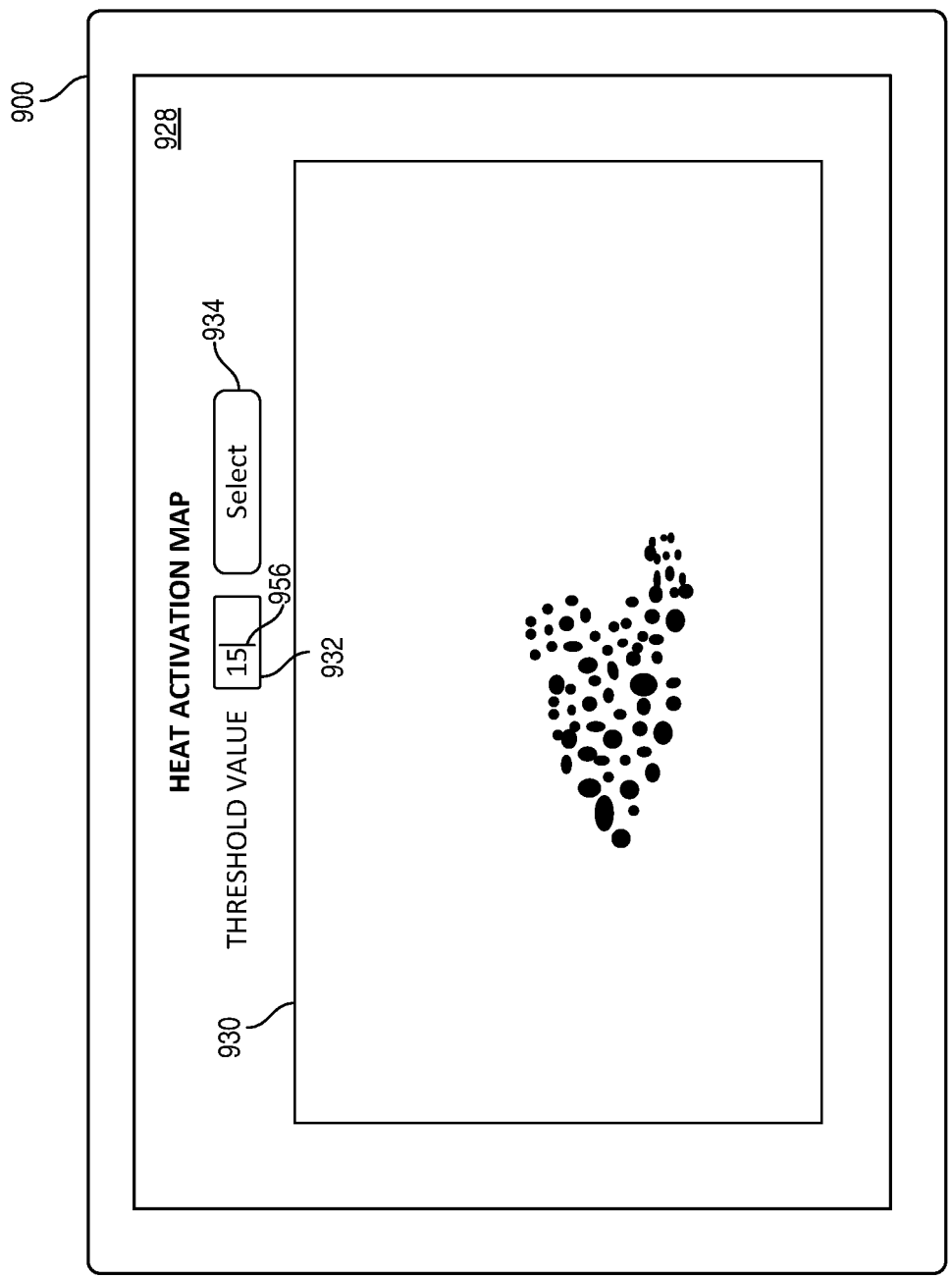

As shown in FIG. 9F, the computing system receives user input 956 in threshold value input 932. Computing system updates the threshold value that is displayed in FIG. 9F (e.g., the displayed threshold value in the threshold input 932 in FIG. 9E (e.g., 10) is updated to display threshold value in the threshold value input in FIG. 9E (e.g., 15).

Figure 9G:
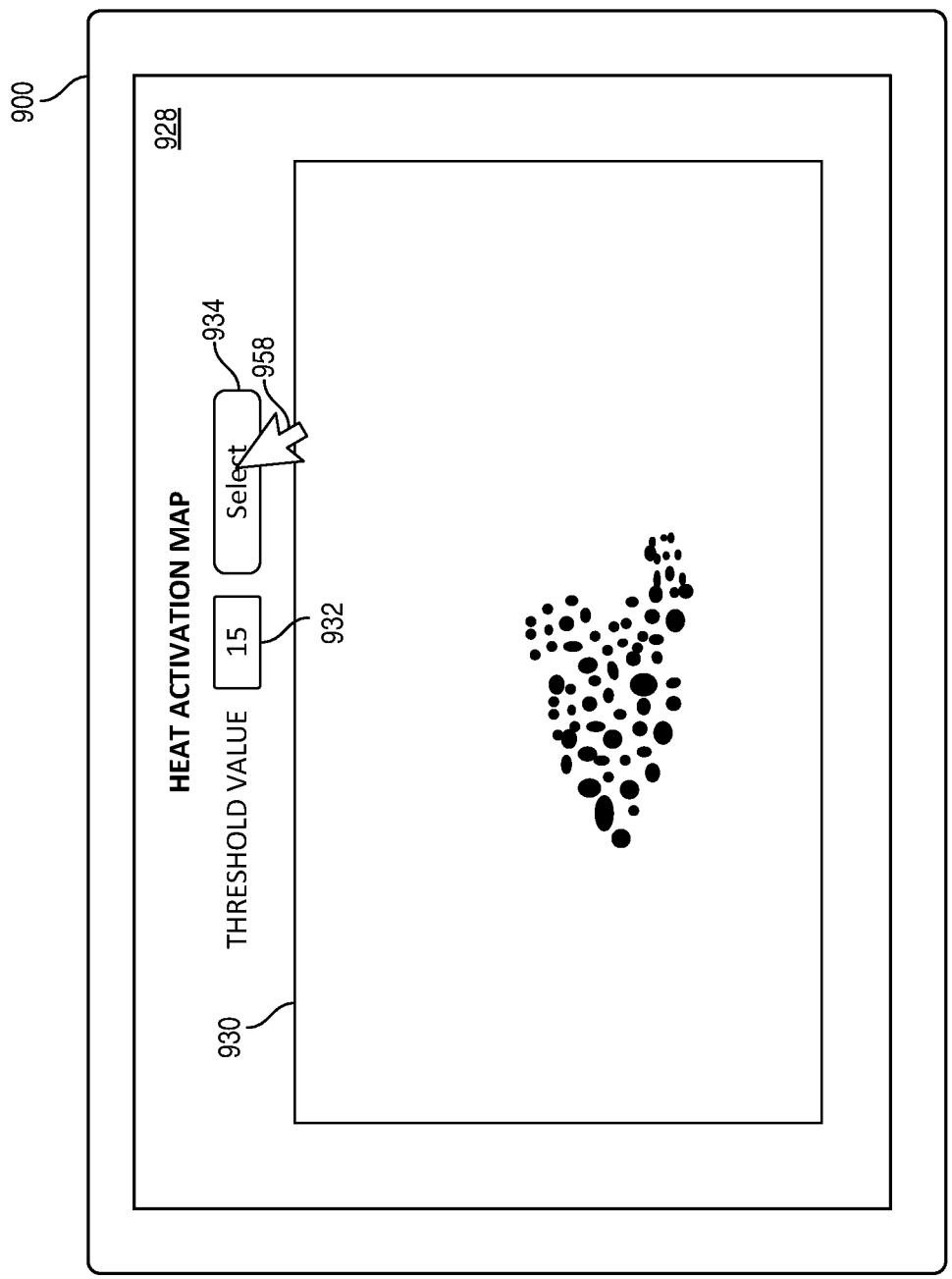

As shown in FIG. 9G, the computing system receives user input 958 corresponding to selection of the threshold value (e.g., user input 958). In response to receiving user input 958 (e.g., on threshold value input 932) corresponding to selection of the threshold value, the computing system replaces the output of heat activation map 930 in FIG. 9G with the heat activation map 936 in FIG. 9H based on the updated threshold value (e.g., the threshold value input 932).

Figure 9H:
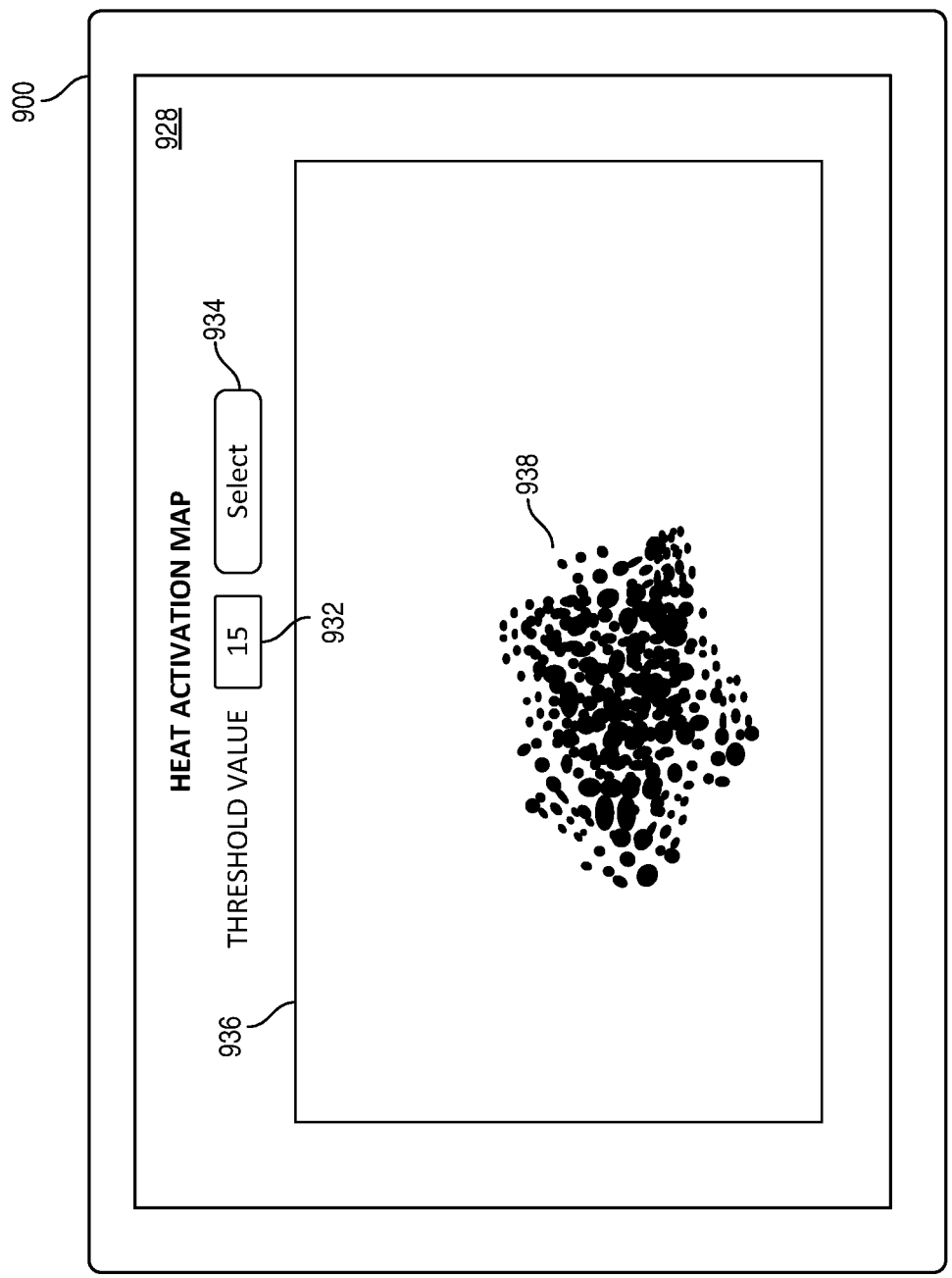

In FIG. 9H, heat activation map 936 includes more activated pixels (e.g., black pixels (e.g., pixel 938)) than heat activation map 930. The heat activation map 936 includes more active pixels than heat activation map 930 due to the high threshold value. In some embodiments, the computing system receives a second prediction of geographic atrophy progression in at least one eye of the patient and replaces the output of heat activation map 930 with the output of heat activation map 936 based on the second prediction.

FIG. 10 illustrates an exemplary method for controlling a user interface in accordance with a prediction of geographic atrophy progression in at least one eye of a patient. Method 1000 is merely exemplary. Thus, some operations in method 1000 are, optionally, combined, the orders of some operations are, optionally, changed, and some operations are, optionally, omitted. In some embodiments, method 1000 can be performed by a system having one or more features of system 100 shown in FIG. 1. For example, one or more blocks of process 1000 can be performed by client device 104.

At block 1002, a computing system (e.g., client device 104) one or more receives retinal images and patient data. In some embodiments, the computing system receives user input (e.g., after selecting affordance 912) that corresponds to the retinal images (e.g., FIG. 5; input 904) and patient data (e.g., FIG. 6; age input 908). In some embodiments, the retinal image includes any type of retinal image that is compliant with the system (e.g., FAF and IR images). In some embodiments, the patient data includes one or more of age, weight, sex, or other patient data as described above (e.g., patient data 600). In some embodiments, the retinal images and patient data correspond to the same patient and were captured during the same timeframe.

At block 1004, the computing system receives (e.g., computing resource 126) a prediction of geographic atrophy progression in at least one eye of a patient. In some embodiments, the computing system determines the prediction of geographic atrophy progression subsequent to receiving the retinal image and patient data at block 1002. In some embodiments, the prediction is determined by an algorithm (e.g., the machine learning model trained in block 410) based on the retinal images and patient data received at block 1002. In some embodiments, the prediction is also based on the prediction timeframe.

In some embodiments, before receiving the prediction, the computing system receives a prediction timeframe. In some of these embodiments, the computing system receives user input that also includes a prediction timeframe (e.g., 910). The prediction timeframe, for example, includes a monthly, 6-month, 12-month, 18-month, etc. timeframe. The timeframe allows the computing system to output a notification (e.g., displaying a notification, controlling a notification, etc.) of a prediction of geographic atrophy progression in at least one eye a patient at a particular time.

In some embodiments, the computing system receives the prediction of geographic atrophy progression by determining, using a machine learning model (e.g., the machine learning model trained in block 410), the prediction of geographic atrophy progression in at least one eye of the patient based on the retinal images and patient data received at block 1002. In some embodiments, the machine learning model was trained based on predictions from other machine learning models (e.g., FIG. 8). In some embodiments, the machine learning model is trained using the algorithms as shown in FIG. 8. In some embodiments, the computing system determines the prediction of geographic atrophy progression in at least one eye of the patient further based on the prediction timeframe.

At block 1006, the computing system outputs a notification (e.g., 918) based on the prediction of the geographic atrophy progression in at least one eye of the patient. Outputting the notification includes displaying the notification, controlling the notification, generating the notification, or the like. In some embodiments, the notification includes one or more of a starting geographic atrophy (e.g., lesion size), predicted geographic atrophy progression (e.g., lesion growth rate), and progression rate. In some embodiments, the notification includes an indication of the rate of geographic atrophy progression (e.g., fast, medium, or slow. In some of these embodiments, the computing system determines to output a rate of "fast" when the geographic atrophy progression prediction is above a predetermined progression threshold value (e.g., 0.13 mm$^2$ per month) or a rate of "slow" when the geographic atrophy progression prediction is below a predetermined threshold value.

Optionally, at block 1008, the computing system outputs (e.g., as described above) a first heat activation map (e.g., 930). For example, a heat activation map communicates the pixels (e.g., 938) that were the most weighted (e.g., active) in making the geographic atrophy progression prediction at block 1004.

In some embodiments, the computing system receives a selection of a threshold value. In some embodiments, the computing system receives user input corresponding to selection of a threshold value. The threshold value is used by the computing system to control the intensity of the pixels in a heat activation map. Controlling (e.g., ability to change) the threshold value allows a clinician or a physician to fine tune a heat activation map to identify the pixels or regions of the eye that are contributing to a greater and/or lesser extent to the prediction of geographic atrophy progression in at least one eye of the patient. In response to receiving the user input, the computing system replaces the display the first heat activation map with a second heat activation map based on the threshold value.

The disclosed embodiments include methods, systems, and computer-readable storage media that trains a predictive model for geographic atrophy progression in at least one eye of a patient. In addition, the disclosed embodiments include methods, systems, and computer-readable storage media that control a user interface in accordance with a prediction of geographic atrophy progression in at least one eye of a patient. For purposes of explanation only, certain aspects and embodiments are described herein with reference to the components illustrated in the above-mentioned figures. The functionality of the illustrated components overlaps, however, and is present in a fewer or greater number of elements and components. Further, all or part of the functionality of the illustrated elements co-exists or be distributed among several geographically dispersed locations. Moreover, the disclosed embodiments are implemented in various environments and are not limited to the illustrated embodiments.

Further, the sequences of operations described in connection with the above-identified figures are exemplary and not intended to be limiting. Additional or fewer operations or combinations of operations are used or vary without departing from the scope of the disclosed embodiments. Also, the processes described herein are not inherently related to any particular system or apparatus and are implemented by any suitable combination of components.

Other aspects of the disclosed embodiments will be apparent to those skilled in the art from consideration of the specification and practice of the disclosed embodiments. It is intended that the specification and examples be considered as exemplary only, with exemplary scopes of the disclosed embodiments being indicated by the following claims.

What is claimed is:

1. A computer-implemented method for predicting geographic atrophy progression, the method comprising:
   at a computing system including at least a first device that includes at least one processor and memory:
      receiving retinal images and patient data corresponding to the retinal images;
      training a first machine learning model based on a first group of the retinal images and patient data corresponding to the first group of the retinal images, wherein the first group includes a first type of retinal image, wherein the first type of retinal image is a fundus autofluorescence image or an optical coherence tomography image;
      training a second machine learning model based on a second group of the retinal images and patient data corresponding to the second group of the retinal images, wherein the second group of the retinal images are different from the first group of retinal images, wherein the second group includes a second type of retinal image, wherein the second type of retinal image is a fundus autofluorescence image or an optical coherence tomography image;
      generating, using the trained first machine learning model, a first prediction of geographic atrophy progression based on a first subset of a third group of the retinal images and patient data corresponding to the first subset of the third group of the retinal images;
      generating, using the trained second machine learning model, a second prediction of geographic atrophy progression based on a second subset of the third group of the retinal images and patient data corresponding to the second subset of the third group of the retinal images; and
      after training the first machine learning model and the second machine learning model, training a third machine learning model to predict a geographic atrophy progression in at least one eye of a patient based on the first prediction, the second prediction, the first subset, the second subset and patient data corresponding to the first subset of the third group of the retinal images and the second subset of the third group of the retinal images.

2. The computer-implemented method of claim 1, further comprising:
   prior to training the first machine learning model or the second machine learning model:
      selecting a first retinal image in the retinal images, the first retinal image including a width and a height;
      in accordance with a determination that the height of the first retinal image is less than the width of the first retinal image:
         removing a plurality of edges from the first retinal image;
         after removing the plurality of edges from the first retinal image, padding the first retinal image; and
         after padding the first retinal image, resizing the first retinal image to a predetermined image size; and
      in accordance with a determination that the height of the first retinal image is not less than the width of the first retinal image:
         removing a portion of the first retinal image; and
         resizing the first retinal image to the predetermined image size.

3. The computer-implemented method of claim 1, wherein the first group of retinal images and the second group of the retinal images include different numbers of retinal images; and wherein the first and second subsets include a same number of retinal images.

4. The computer-implemented method of claim 1, wherein the first group of the retinal images and the second group of the retinal images include more images than the third group of retinal images.

5. The computer-implemented method of claim 1, wherein the first subset includes first retinal images and the second subset includes second retinal images, wherein the first retinal images and the second retinal images share patient data from a respective patient visit.

6. The computer-implemented method of claim 5, wherein the respective patient visit corresponds to a closest patient visit for a respective patient that occurred within a timeframe.

7. The computer-implemented method of claim 1, wherein the first machine learning model and the second machine learning model are trained in parallel.

8. The computer-implemented method of claim 1, wherein the first machine learning model includes a first plurality of machine learning models, and wherein the first plurality of machine learning models are trained in parallel.

9. The computer-implemented method of claim 1, wherein the first machine learning model is a fusion of a second plurality of machine learning models.

10. The computer-implemented method of claim 1, wherein training the third machine learning model to predict the geographic atrophy progression in at least one eye of the patient comprises:
using a multilayer perceptron algorithm to train the third machine learning model to predict the geographic atrophy progression.

11. The computer-implemented method of claim 1, further comprising:
in accordance with a determination that respective criteria are met, wherein the respective criteria includes a criterion that is satisfied when a time of capturing a fourth retinal image is known, an actual lesion size for an eye of a patient associated with the fourth retinal image is available, and the patient associated with the fourth retinal image has a retinal image for the at least one eye of the patient that exist within a second timeframe, including the fourth retinal image in the first group of the retinal images or the second group of retinal images; and
in accordance with a determination that the respective criteria are not met, forgoing to include the fourth retinal image in the first group of the retinal images or the second group of retinal images.

12. An electronic device for training a predictive model for geographic atrophy progression in at least one eye of a patient, the electronic device comprising:
at least one processor; and
memory storing one or more programs configured to be executed by the at least one processor, the one or more programs including instructions for:
receiving retinal images and patient data corresponding to the retinal images;
training a first machine learning model based on a first group of the retinal images and patient data corresponding to the first group of the retinal images, wherein the first group includes a first type of retinal image, wherein the first type of retinal image is a fundus autofluorescence image or an optical coherence tomography image;
training a second machine learning model based on a second group of the retinal images and patient data corresponding to the second group of the retinal images, wherein the second group of the retinal images are different from the first group of retinal images, wherein the second group includes a second type of retinal image, wherein the second type of retinal image is a fundus autofluorescence image or an optical coherence tomography image;
generating, using the trained first machine learning model, a first prediction of geographic atrophy progression based on a first subset of a third group of the retinal images and patient data corresponding to the first subset of the third group of the retinal images;
generating, using the trained second machine learning model, a second prediction of geographic atrophy progression based on a second subset of the third group of the retinal images and patient data corresponding to the second subset of the third group of the retinal images; and
after training the first machine learning model and the second machine learning model, training a third machine learning model to predict a geographic atrophy progression in at least one eye of a patient based on the first prediction, the second prediction, the first subset, the second subset and patient data corresponding to the first subset of the third group of the retinal images and the second subset of the third group of the retinal images.

13. A non-transitory computer-readable storage medium storing one or more programs configured to be executed by one or more processors of an electronic device with at least one processor and memory, the one or more programs including instructions for training a predictive model for geographic atrophy progression in at least one eye of a patient, the instructions including:
receiving retinal images and patient data corresponding to the retinal images;
training a first machine learning model based on a first group of the retinal images and patient data corresponding to the first group of the retinal images, wherein the first group includes a first type of retinal image, wherein the first type of retinal image is a fundus autofluorescence image or an optical coherence tomography image;
training a second machine learning model based on a second group of the retinal images and patient data corresponding to the second group of the retinal images, wherein the second group of the retinal images are different from the first group of retinal images, wherein the second group includes a second type of retinal image, wherein the second type of retinal image is a fundus autofluorescence image or an optical coherence tomography image;
generating, using the trained first machine learning model, a first prediction of geographic atrophy progression based on a first subset of a third group of the retinal images and patient data corresponding to the first subset of the third group of the retinal images;
generating, using the trained second machine learning model, a second prediction of geographic atrophy progression based on a second subset of the third group of the retinal images and patient data corresponding to the second subset of the third group of the retinal images; and
after training the first machine learning model and the second machine learning model, training a third machine learning model to predict a geographic atrophy progression in at least one eye of a patient based on the first prediction, the second prediction, the first subset, the second subset and patient data corresponding to the first subset of the third group of the retinal images and the second subset of the third group of the retinal images.

14. The computer-implemented method of claim 1, wherein:
the second type of retinal image is different from the first type of retinal image;
the first type of retinal image is a fundus autofluorescence image; and
the second type of retinal image is an optical coherence tomography image.

15. The computer-implemented method of claim 1, further comprising:
receiving retinal images and patient data corresponding to a first patient;
generating, using the trained third machine learning model, a prediction of geographic atrophy progression in at least one eye of the first patient based retinal images and patient data corresponding to the first patient; and outputting the prediction of the geographic atrophy progression in at least one eye of the first patient.

* * * * *